US012631284B2

(12) United States Patent
Ki et al.

(10) Patent No.: US 12,631,284 B2
(45) Date of Patent: *May 19, 2026

(54) VACUUM ADIABATIC BODY AND REFRIGERATOR

(71) Applicant: LG ELECTRONICS INC., Seoul (KR)

(72) Inventors: Duchan Ki, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

This patent is subject to a terminal disclaimer.

(21) Appl. No.: 17/986,625

(22) Filed: Nov. 14, 2022

(65) Prior Publication Data

US 2023/0075837 A1     Mar. 9, 2023

Related U.S. Application Data

(63) Continuation of application No. 16/766,215, filed as application No. PCT/KR2018/015703 on Dec. 11, 2018, now Pat. No. 11,543,067.

(30) Foreign Application Priority Data

Dec. 13, 2017     (KR) ........................ 10-2017-0171630

(51) Int. Cl.
　*F16L 59/065*　　　(2006.01)
　*F16L 59/02*　　　(2006.01)
　　　　　(Continued)

(52) U.S. Cl.
　CPC ............. *F16L 59/065* (2013.01); *F16L 59/02* (2013.01); *F25D 23/065* (2013.01);
　　　　　(Continued)

(58) Field of Classification Search
　CPC ..... F16L 59/065; F16L 59/02; F25D 2400/40; F25D 2400/02; F25D 21/04;
　　　　　(Continued)

(56) References Cited

U.S. PATENT DOCUMENTS 1,969,621 A　*　8/1934　Munters ................. F25D 23/06
　　　　　　　　　　　428/69
2,000,882 A　*　5/1935　Comstock ............. F25D 23/062
　　　　　　　　　　　220/592.27
　　　　　(Continued)

FOREIGN PATENT DOCUMENTS

CN　　　1062591　　7/1992
CN　　　1420331　　5/2003
　　　　　(Continued)

OTHER PUBLICATIONS

U.S. Office Action dated Feb. 21, 2023 issued in U.S. Appl. No. 17/555,733.

(Continued)

*Primary Examiner* — Andrew Roersma
(74) *Attorney, Agent, or Firm* — KED & ASSOCIATES, LLP

(57)　　　　　ABSTRACT

A vacuum adiabatic body according to the present invention includes a conductive resistance sheet which connects a first plate member and a second plate member to each other; a sealing frame which covers the conductive resistance sheet; a part fixing frame which is supported by the sealing frame; and a part which is mounted on the part fixing frame. According to the present invention, the power necessary for operation can be stably supplied while heat loss is prevented.

14 Claims, 23 Drawing Sheets

(51) Int. Cl.

| | |
|---|---|
| *F25D 23/06* | (2006.01) |
| *F25D 23/08* | (2006.01) |
| *F25D 27/00* | (2006.01) |
| *F25D 29/00* | (2006.01) |

(52) U.S. Cl.
CPC ........... *F25D 23/087* (2013.01); *F25D 27/00* (2013.01); *F25D 29/005* (2013.01); *F25D 2201/14* (2013.01); *F25D 2400/40* (2013.01)

(58) Field of Classification Search
CPC .. F25D 2201/14; F25D 23/065; F25D 23/063; F25D 29/005; F25D 29/00; F25D 27/00; F25D 27/005; F25D 23/087
See application file for complete search history.

(56) References Cited

U.S. PATENT DOCUMENTS

| | | | | |
|---|---|---|---|---|
| 2,464,526 | A | 3/1949 | Palmer | |
| 2,518,673 | A * | 8/1950 | Ellsworth | F25D 23/085 |
| | | | | 220/592.06 |
| 2,708,774 | A * | 5/1955 | Seelen | E06B 3/66347 |
| | | | | 428/34 |
| 2,855,636 | A * | 10/1958 | Donnelly | F25D 23/085 |
| | | | | 52/794.1 |
| 2,989,156 | A | 6/1961 | Brooks et al. | |
| 2,995,649 | A * | 8/1961 | Cyrus | F25D 27/00 |
| | | | | 362/222 |
| 3,161,265 | A * | 12/1964 | Matsch | E04B 1/803 |
| | | | | 52/794.1 |
| 3,353,301 | A * | 11/1967 | Heilweil | F25D 21/04 |
| | | | | 49/478.1 |
| 3,405,986 | A | 10/1968 | Cannon | |
| 3,936,553 | A | 2/1976 | Rowe | |
| 4,632,470 | A | 12/1986 | Jenkins | |
| 4,822,117 | A | 4/1989 | Boston, Jr. | |
| 5,011,729 | A | 4/1991 | Mcallister | |
| 5,429,398 | A | 7/1995 | Lupke | |
| 5,485,397 | A | 1/1996 | Yamazato | |
| 5,897,181 | A | 4/1999 | Avendano et al. | |
| 6,038,830 | A * | 3/2000 | Hirath | F16L 59/065 |
| | | | | 428/69 |
| 6,053,594 | A * | 4/2000 | Wenning | F25D 23/085 |
| | | | | 428/69 |
| 6,178,763 | B1 | 1/2001 | Brancheau et al. | |
| 6,209,342 | B1 | 4/2001 | Banicevic et al. | |
| 6,350,002 | B1 | 2/2002 | Takaoka et al. | |
| 6,485,122 | B2 * | 11/2002 | Wolf | F25D 23/085 |
| | | | | 220/592.06 |
| 6,725,624 | B2 * | 4/2004 | Hirath | F25D 23/062 |
| | | | | 52/800.11 |
| 6,779,357 | B1 | 8/2004 | Fann | |
| 6,926,863 | B1 | 8/2005 | Goeldner | |
| 7,407,240 | B2 | 8/2008 | Collins | |
| 7,762,634 | B2 | 7/2010 | Tenra | |
| 8,211,523 | B2 | 7/2012 | Fujimori | |
| 8,864,253 | B2 | 10/2014 | Görz et al. | |
| 8,920,899 | B2 | 12/2014 | Fujimori | |
| 9,074,717 | B2 | 7/2015 | Nomura | |
| 9,155,419 | B2 | 10/2015 | Bird | |
| 9,170,046 | B2 | 10/2015 | Jung | |
| 9,190,046 | B2 | 11/2015 | Jung | |
| 9,441,779 | B1 | 9/2016 | Alshourbagy et al. | |
| 9,546,481 | B2 | 1/2017 | Kimura | |
| 9,557,092 | B1 | 1/2017 | Heussner | |
| 9,689,604 | B2 | 6/2017 | Wu | |
| 9,696,083 | B2 | 7/2017 | Kim et al. | |
| 9,702,615 | B1 | 7/2017 | Chartrand | |
| 9,849,405 | B2 | 12/2017 | Smith | |
| 10,088,227 | B2 | 10/2018 | Bowdish | |
| 10,129,994 | B1 | 11/2018 | Sulem et al. | |
| 10,180,280 | B2 | 1/2019 | Lee | |
| 10,274,247 | B2 | 4/2019 | Jeong et al. | |
| 10,712,080 | B2 | 7/2020 | Westlake | |

| | | | | |
|---|---|---|---|---|
| 10,753,669 | B2 | 8/2020 | Dherde et al. | |
| 10,760,849 | B2 | 9/2020 | Jung et al. | |
| 10,816,129 | B2 | 10/2020 | Jung | |
| 10,837,696 | B2 | 11/2020 | Jung et al. | |
| 10,907,883 | B2 | 2/2021 | Dherde et al. | |
| 10,907,887 | B2 | 2/2021 | Jung et al. | |
| 10,913,232 | B2 | 2/2021 | Dye et al. | |
| 10,941,974 | B2 | 3/2021 | Jung et al. | |
| 11,047,616 | B2 | 6/2021 | Jeong et al. | |
| 11,079,171 | B2 | 8/2021 | Marinello et al. | |
| 11,248,833 | B2 | 2/2022 | Kim et al. | |
| 11,543,067 | B2 * | 1/2023 | Ki | F16L 59/02 |
| 11,835,290 | B2 | 12/2023 | Kim et al. | |
| 2002/0041134 | A1 | 4/2002 | Wolf et al. | |
| 2002/0100250 | A1 | 8/2002 | Hirath et al. | |
| 2003/0041612 | A1 * | 3/2003 | Piloni | F16L 59/065 |
| | | | | 62/277 |
| 2004/0012315 | A1 | 1/2004 | Grace | |
| 2004/0035142 | A1 | 2/2004 | Yoon et al. | |
| 2004/0226956 | A1 | 11/2004 | Brooks | |
| 2005/0175809 | A1 | 8/2005 | Hirai | |
| 2006/0130513 | A1 | 6/2006 | Chang et al. | |
| 2007/0133192 | A1 | 6/2007 | Alessandro | |
| 2007/0228907 | A1 | 10/2007 | Luisi et al. | |
| 2008/0095970 | A1 | 4/2008 | Takashima | |
| 2008/0302441 | A1 | 12/2008 | Kelly et al. | |
| 2009/0031659 | A1 * | 2/2009 | Kalfon | H05K 5/0209 |
| | | | | 137/511 |
| 2009/0113899 | A1 | 5/2009 | Dain et al. | |
| 2009/0284116 | A1 | 11/2009 | Görz et al. | |
| 2010/0104923 | A1 | 4/2010 | Takeguchi et al. | |
| 2010/0252698 | A1 | 10/2010 | Dye et al. | |
| 2010/0279055 | A1 | 11/2010 | Song | |
| 2010/0287974 | A1 | 11/2010 | Cur et al. | |
| 2011/0011106 | A1 | 1/2011 | Ahn et al. | |
| 2011/0209493 | A1 | 9/2011 | Schenk | |
| 2012/0044131 | A1 | 2/2012 | Nussbächer et al. | |
| 2012/0104923 | A1 * | 5/2012 | Jung | F25D 23/065 |
| | | | | 312/406 |
| 2012/0125039 | A1 | 5/2012 | Hwang | |
| 2012/0128420 | A1 | 5/2012 | Schroeder | |
| 2012/0128920 | A1 | 5/2012 | Yoon et al. | |
| 2012/0235551 | A1 | 9/2012 | Park et al. | |
| 2012/0248125 | A1 | 10/2012 | Fricke et al. | |
| 2013/0105494 | A1 | 5/2013 | Jung | |
| 2013/0105495 | A1 * | 5/2013 | Jung | F25D 23/061 |
| | | | | 220/592.05 |
| 2013/0105496 | A1 | 5/2013 | Jung | |
| 2013/0111942 | A1 | 5/2013 | Jung | |
| 2013/0257256 | A1 | 10/2013 | Allard et al. | |
| 2014/0346942 | A1 * | 11/2014 | Kim | F25D 23/064 |
| | | | | 29/530 |
| 2014/0369063 | A1 | 12/2014 | Kleo et al. | |
| 2015/0030800 | A1 | 1/2015 | Jung et al. | |
| 2015/0192355 | A1 | 7/2015 | Joo et al. | |
| 2015/0245720 | A1 | 9/2015 | Isfort et al. | |
| 2015/0276302 | A1 | 10/2015 | Roh et al. | |
| 2016/0047592 | A1 * | 2/2016 | Rolek | F25D 23/065 |
| | | | | 312/406.1 |
| 2016/0047593 | A1 | 2/2016 | Jung et al. | |
| 2016/0109172 | A1 | 4/2016 | Kim et al. | |
| 2016/0161174 | A1 | 6/2016 | Yi et al. | |
| 2016/0220039 | A1 | 8/2016 | Chang et al. | |
| 2016/0258671 | A1 * | 9/2016 | Allard | F25D 23/085 |
| 2017/0167781 | A1 | 6/2017 | Mukherjee | |
| 2017/0176090 | A1 | 6/2017 | Allard et al. | |
| 2017/0176092 | A1 | 6/2017 | Naik | |
| 2017/0184341 | A1 | 6/2017 | Grimm et al. | |
| 2017/0292776 | A1 * | 10/2017 | Kim | F25D 23/062 |
| 2017/0336129 | A1 | 11/2017 | Cunningham | |
| 2017/0370632 | A1 | 12/2017 | Jeong et al. | |
| 2018/0142938 | A1 * | 5/2018 | Ciyanoglu | F25D 23/061 |
| 2018/0156523 | A1 | 6/2018 | Park et al. | |
| 2018/0180350 | A1 * | 6/2018 | Yoon | F25D 23/063 |
| 2018/0216872 | A1 | 8/2018 | Jung et al. | |
| 2018/0216873 | A1 | 8/2018 | Jung et al. | |
| 2018/0238610 | A1 | 8/2018 | Jung et al. | |
| 2018/0292127 | A1 | 10/2018 | Park et al. | |
| 2019/0120543 | A1 | 4/2019 | Jung et al. | |

(56) References Cited

U.S. PATENT DOCUMENTS

| | | | |
|---|---|---|---|
| 2019/0120544 A1 | 4/2019 | Deka | |
| 2019/0120547 A1 | 4/2019 | Staud et al. | |
| 2019/0145697 A1 | 5/2019 | Naik | |
| 2019/0154328 A1 * | 5/2019 | Dherde | E05D 5/046 |
| 2019/0310011 A1 * | 10/2019 | Marinello | F25D 23/066 |
| 2020/0056831 A1 | 2/2020 | Jung et al. | |
| 2020/0182393 A1 | 6/2020 | Jung et al. | |
| 2020/0370819 A1 | 11/2020 | Kim | |
| 2021/0108852 A1 | 4/2021 | Guizoni | |
| 2021/0108882 A1 | 4/2021 | Duford | |
| 2021/0123658 A1 | 4/2021 | Jung et al. | |
| 2021/0140704 A1 | 5/2021 | Kim et al. | |
| 2021/0190255 A1 | 6/2021 | Allard | |
| 2021/0254887 A1 | 8/2021 | Jung et al. | |
| 2022/0136762 A1 | 5/2022 | Raskar | |
| 2022/0205708 A1 | 6/2022 | Harikrishnasamy et al. | |
| 2023/0213269 A1 | 7/2023 | Jung et al. | |
| 2024/0263869 A1 | 8/2024 | Jung et al. | |

FOREIGN PATENT DOCUMENTS

| | | | |
|---|---|---|---|
| CN | 1603728 | 4/2005 | |
| CN | 2800193 | 7/2006 | |
| CN | 101995140 | 3/2011 | |
| CN | 102679663 | 9/2012 | |
| CN | 102829593 | 12/2012 | |
| CN | 103090615 | 5/2013 | |
| CN | 103189696 | 7/2013 | |
| CN | 103471314 | 12/2013 | |
| CN | 103733007 | 4/2014 | |
| CN | 105393073 | 3/2016 | |
| CN | 105627657 | 6/2016 | |
| CN | 106016931 | 10/2016 | |
| CN | 106052248 | 10/2016 | |
| CN | 106642951 | 5/2017 | |
| CN | 107110593 | 8/2017 | |
| CN | 107850377 | 3/2018 | |
| DE | 19745825 | 4/1999 | |
| EP | 1338854 | 8/2003 | |
| EP | 1338854 A1 * | 8/2003 | F25D 23/063 |
| EP | 2447639 | 5/2012 | |
| EP | 2 589 904 | 5/2013 | |
| EP | 2985551 | 2/2016 | |
| EP | 2995888 | 3/2016 | |
| EP | 3105519 | 12/2016 | |
| EP | 3 193 110 | 7/2017 | |
| GB | 890372 | 2/1962 | |
| JP | S58-64239 | 4/1983 | |
| JP | H04-327779 | 11/1992 | |
| JP | 08-303937 | 11/1996 | |
| JP | 08-338679 | 12/1996 | |
| JP | 2004-293913 | 10/2004 | |
| JP | 2008-089244 | 4/2008 | |
| JP | 2013-002655 | 1/2013 | |
| JP | 2014-126219 | 7/2014 | |
| JP | 2015-129634 A | 7/2015 | |
| JP | 2018-117771 | 8/2018 | |
| KR | 20-1998-0018139 | 7/1998 | |
| KR | 10-0343719 | 7/2002 | |
| KR | 10-2006-0071848 | 6/2006 | |
| KR | 10-0725790 | 6/2007 | |
| KR | 10-2011-0006997 | 1/2011 | |
| KR | 10-2011-0006998 | 1/2011 | |
| KR | 10-2011-0056943 | 5/2011 | |
| KR | 200461789 Y1 * | 8/2012 | F25D 23/028 |
| KR | 10-2013-0048529 | 5/2013 | |
| KR | 10-2015-0012712 | 2/2015 | |
| KR | 10-2016-0044842 | 4/2016 | |
| KR | 10-2016-0046713 | 4/2016 | |
| KR | 10-1631904 | 6/2016 | |
| KR | 10-2017-0016187 | 2/2017 | |
| RU | 2 315 925 | 1/2008 | |
| RU | 2 468 316 | 11/2012 | |
| RU | 2496063 | 10/2013 | |
| RU | 2608791 | 1/2017 | |

| | | | | |
|---|---|---|---|---|
| SU | 1742602 A1 | 6/1992 | | |
| SU | 1781519 | 12/1992 | | |
| WO | WO 2000/0004935 | 2/2000 | | |
| WO | WO 02/12810 | 2/2002 | | |
| WO | WO 2006/011112 | 2/2006 | | |
| WO | WO 2012/050308 | 4/2012 | | |
| WO | WO-2013080477 A1 * | 6/2013 | | F25D 23/069 |
| WO | WO-2013084648 A1 * | 6/2013 | | F25D 23/003 |
| WO | WO 2013/164176 | 11/2013 | | |
| WO | WO 2014-103753 | 7/2014 | | |
| WO | WO 2014/196609 | 12/2014 | | |
| WO | WO-2015029410 A1 * | 3/2015 | | F25D 23/085 |
| WO | WO 2016/105019 | 6/2016 | | |
| WO | WO 2017/023088 | 2/2017 | | |
| WO | WO 2017/023094 | 2/2017 | | |
| WO | WO 2017/023095 | 2/2017 | | |
| WO | WO 2017/023100 | 2/2017 | | |
| WO | WO 2017/080767 | 5/2017 | | |
| WO | WO 2017/119614 | 7/2017 | | |
| WO | WO 2017/180126 | 10/2017 | | |
| WO | WO-2018022008 A1 * | 2/2018 | | F25D 23/028 |
| WO | WO 2019 /117599 | 6/2019 | | |

OTHER PUBLICATIONS

U.S. Office Action dated Feb. 24, 2023 issued in U.S. Appl. No. 16/767,899.

U.S. Notice of Allowance dated Oct. 23, 2023 issued in U.S. Appl. No. 17/705,764.

International Search Report dated Mar. 20, 2019 issued in Application No. PCT/KR2018/015703.

Written Opinion dated Mar. 20, 2019 issued in Application No. PCT/KR2018/015703.

International Search Report Mar. 20, 2019 issued in Application No. PCT/KR2018/015706.

Written Opinion dated Mar. 20, 2019 issued in Application No. PCT/KR2018/015706.

International Search Report Mar. 20, 2019 issued in Application No. PCT/KR2018/015709.

Written Opinion dated Mar. 20, 2019 issued in Application No. PCT/KR2018/015709.

International Search Report Mar. 20, 2019 issued in Application No. PCTKR2018/015710.

Written Opinion dated Mar. 20, 2019 issued in Application No. PCT/KR2018/015710.

International Search Report Mar. 28, 2019 issued in Application No. PCT/KR2018/015713.

Written Opinion dated Mar. 28, 2019 issued in Application No. PCT/KR2018/015713.

Russian Office Action dated Apr. 20, 2021 issued in RU Application No. 2020122682/10(039009).

Russian Office Action dated Apr. 20, 2021 issued in Application 2020122685/10(039012).

United States Office Action dated Jul. 1, 2021 issued in U.S. Appl. No. 16/766,233.

Russian Office Action dated May 11, 2021 in RU Application No. 2020122686/10(039013).

United States Office Action dated Sep. 28, 2021 issued in co-pending related U.S. Appl. No. 16/766,562.

European Search Report dated Jul. 22, 2021 issued in EP Application No. 18888053.8.

Chinese Office Action dated Aug. 23, 2021 issued in CN Application No. 201880081068.3.

European Search Report dated Jul. 29, 2021 issued in Application No. 18889271.5.

Chinese Office Action dated Jul. 28, 2021 issued in Application No. 201880080796.2.

Chinese Office Action dated Aug. 4, 2021 issued in Application No. 201880080831.0.

European Search Report dated Jul. 29, 2021 issued in Application No. 18887635.3.

European Search Report dated Aug. 9, 2021 issued in EP Application No. 18889452.1.

(56) References Cited

OTHER PUBLICATIONS

Chinese Office Action dated Aug. 20, 2021 issued in CN Application No. 201880080785.4.
Chinese Office Action dated Sep. 2, 2021 issued in CN Application No. 201880080793.9.
United States Notice of Allowance dated Dec. 27, 2021 issued in co-pending related U.S. Appl. No. 16/768,379.
Common Knowledge: 8.5.2 Installation of VFD and Connection Between Motor and PLCVFD (Apr. 22, 2022).
Chinese Office Action dated Apr. 28, 2022 issued in CN Application No. 201880081068.3.
Indian Office Action dated May 20, 2022 issued in Application 202017024179.
Korean Notice of Allowance dated Aug. 8, 2022 issued in Application 10-2017-0171630.
United States Office Action dated Oct. 6, 2022 issued in co-pending related U.S. Appl. No. 16/767,899.
United States Office Action dated Nov. 7, 2022 issued in co-pending related U.S. Appl. No. 17/555,733.
Korean Notice of Allowance dated May 19, 2023 issued in Application No. 10-2017-0171661.
Korean Office Action dated May 1, 2024 issued in Application No. 10-2023-0106442.
U.S. Appl. No. 17/986,625, filed Nov. 14, 2022.
U.S. Appl. No. 18/384,570, filed Oct. 27, 2023.
U.S. Appl. No. 17/705,764, filed Mar. 28, 2022.
U.S. Appl. No. 18/233,517, filed Aug. 14, 2023.
U.S. Appl. No. 18/419,927, filed Jan. 23, 2024.
Chinese Office Action dated Apr. 29, 2023 issued in Application No. 202210306278.6.
European Office Action dated Jul. 12, 2023 issued in Application No. 18889271.5.
Chinese Office Action dated Apr. 26, 2023 issued in Application No. 202210685871.6.
Korean Office Action dated Sep. 4, 2023 issued in Application No. 10-2023-0032773.
Chinese Office Action dated Feb. 7, 2024 issued in Application No. 202210685871.6.
Australian Office Action dated Apr. 4, 2024 issued in Application No. 2022215241.
U.S. Office Action dated Oct. 28, 2021 issued in U.S. Appl. No. 16/766,215.
U.S. Appl. No. 17/555,733, filed Dec. 20, 2021.
U.S. Appl. No. 17/957,503, filed Sep. 30, 2022.
U.S. Appl. No. 16/767,899, filed May 28, 2020.
U.S. Notice of Allowance dated May 16, 2023 issued in U.S. Appl. No. 16/767,899.
U.S. Office Action dated May 28, 2024 issued in U.S. Appl. No. 18/384,570.
Korean Office Action dated Sep. 18, 2023 issued in Application No. 10-2023-0058225.
Australian Office Action dated Nov. 8, 2023 issued in Application No. 2022221530.
U.S. Office Action dated Jan. 30, 2025, issued in U.S. Appl. No. 18/233,517.
Korean Office Action dated Sep. 6, 2023 issued in Application No. 10-2023-0106442.
Australian Office Action dated Sep. 28, 2023 issued in Application No. 2022215219.
U.S. Office Action dated Oct. 8, 2024 issued in U.S. Appl. No. 18/233,517.
U.S. Office Action dated Mar. 31, 2023 issued in U.S. Appl. No. 17/705,764.
Russian notice of Allowance dated Feb. 6, 2025 issued in Application No. 2021133252.
Extended European Search Report dated Oct. 2, 2025 issued in Application No. 25189073.7.

* cited by examiner

[Fig. 1]

[Fig. 2]
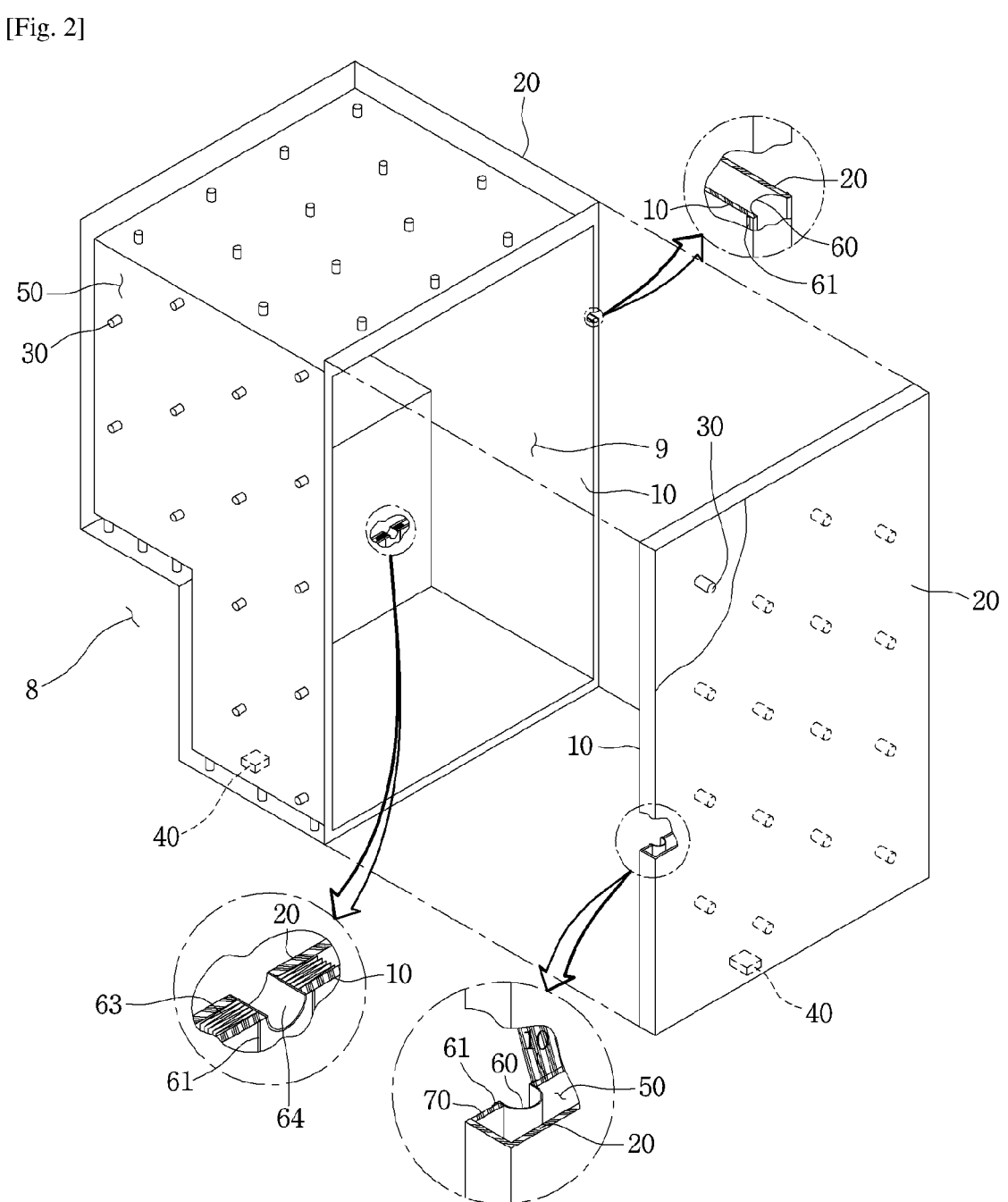

[Fig. 3]
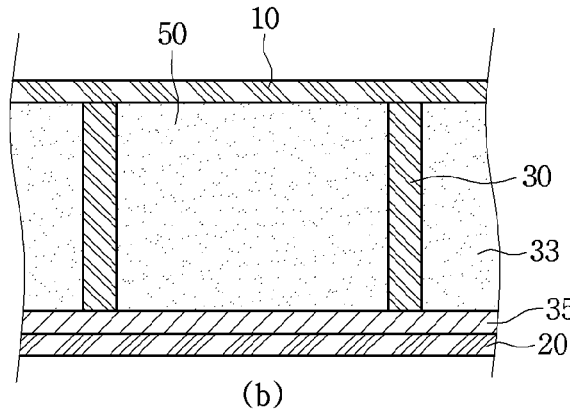
(a)
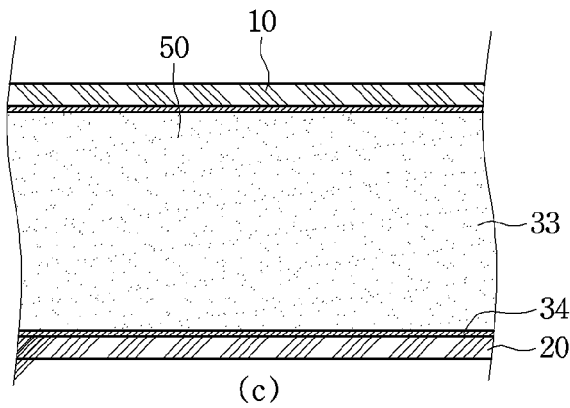
(b)
(c)

[Fig. 4]
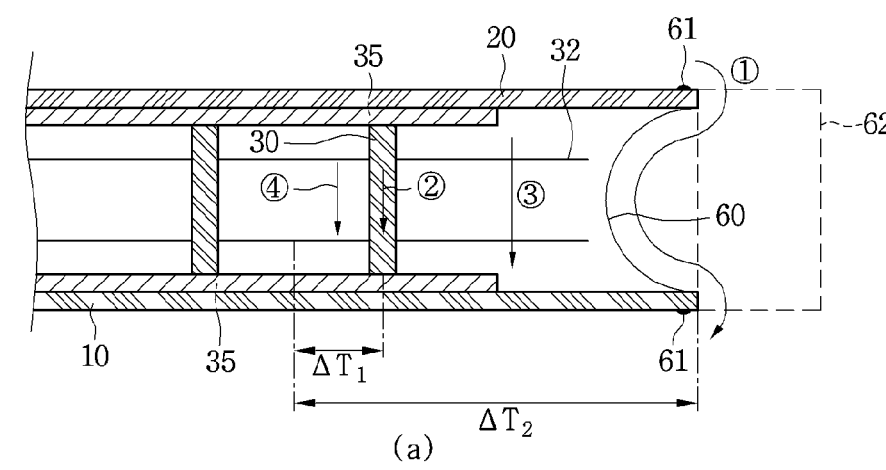
(a)
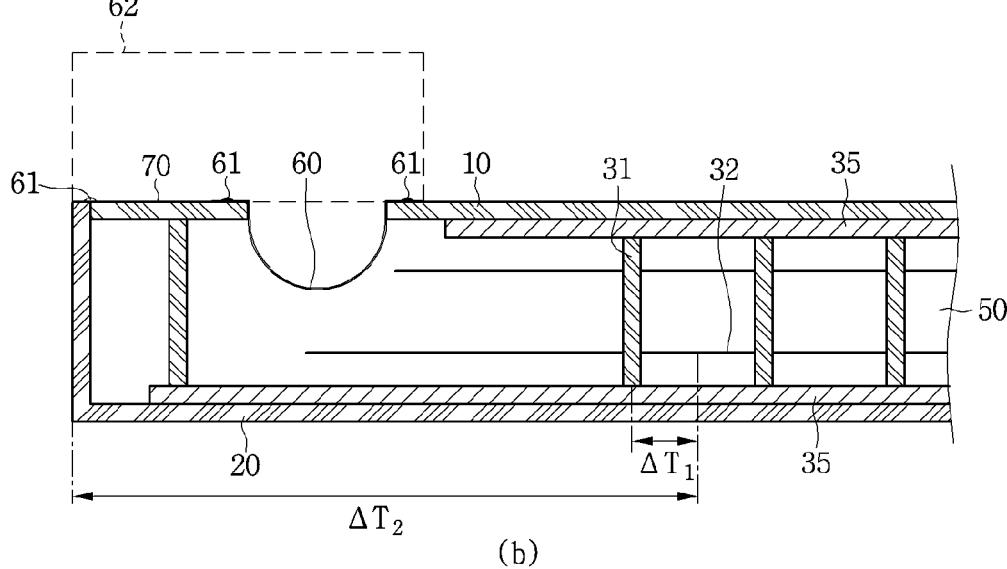
(b)
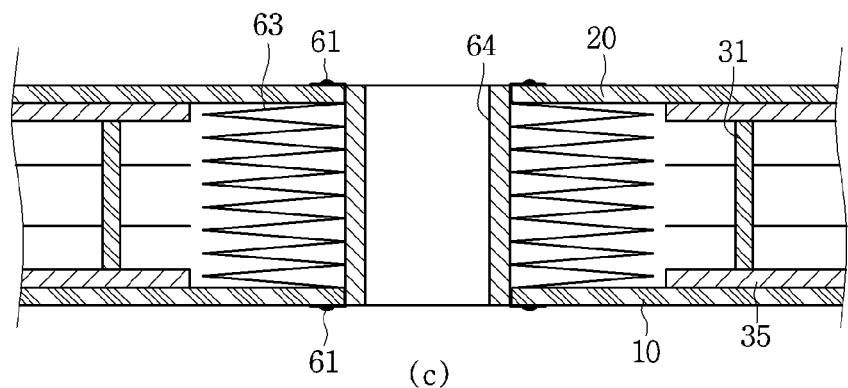
(c)

[Fig. 5]
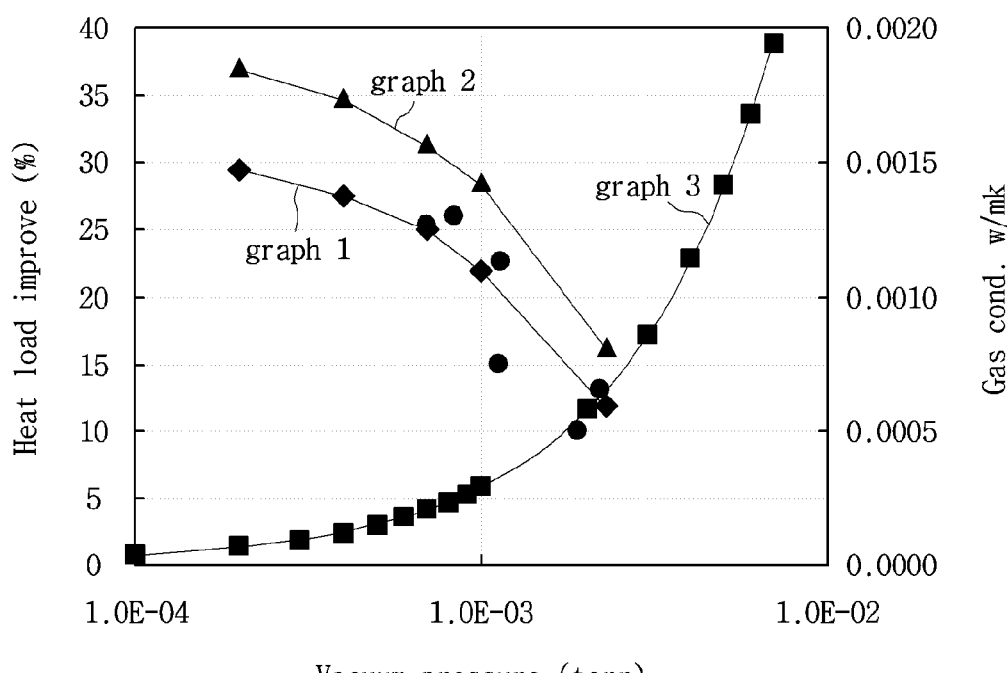
[Fig. 6]
(P) Torr
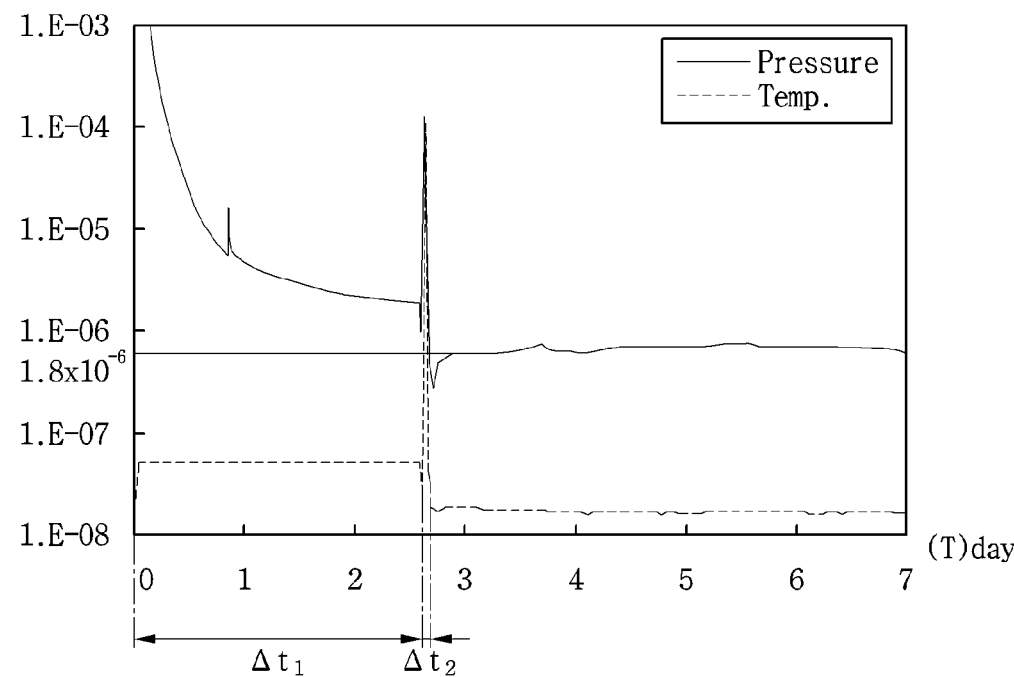

[Fig. 7]
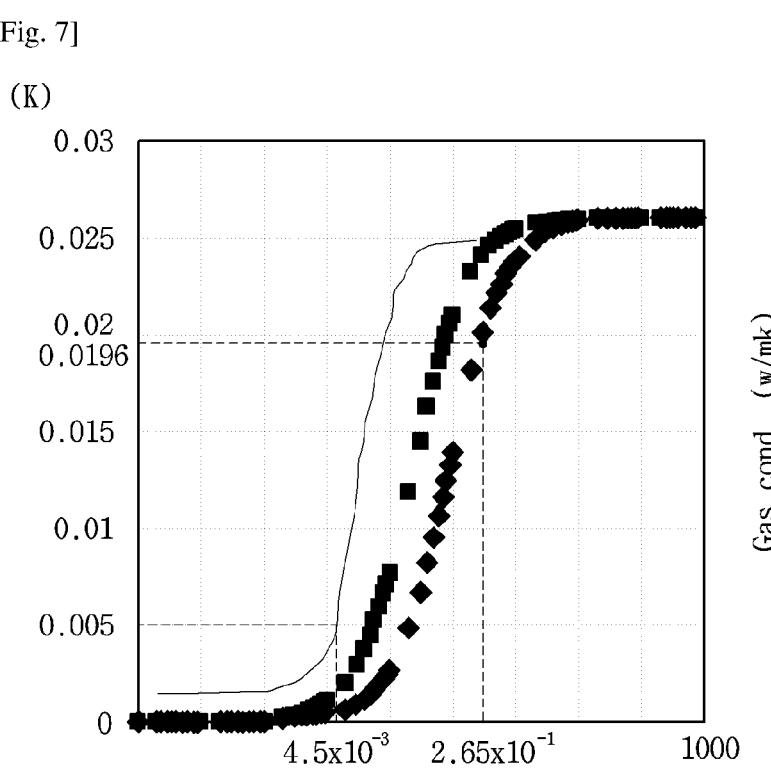
[Fig. 8]
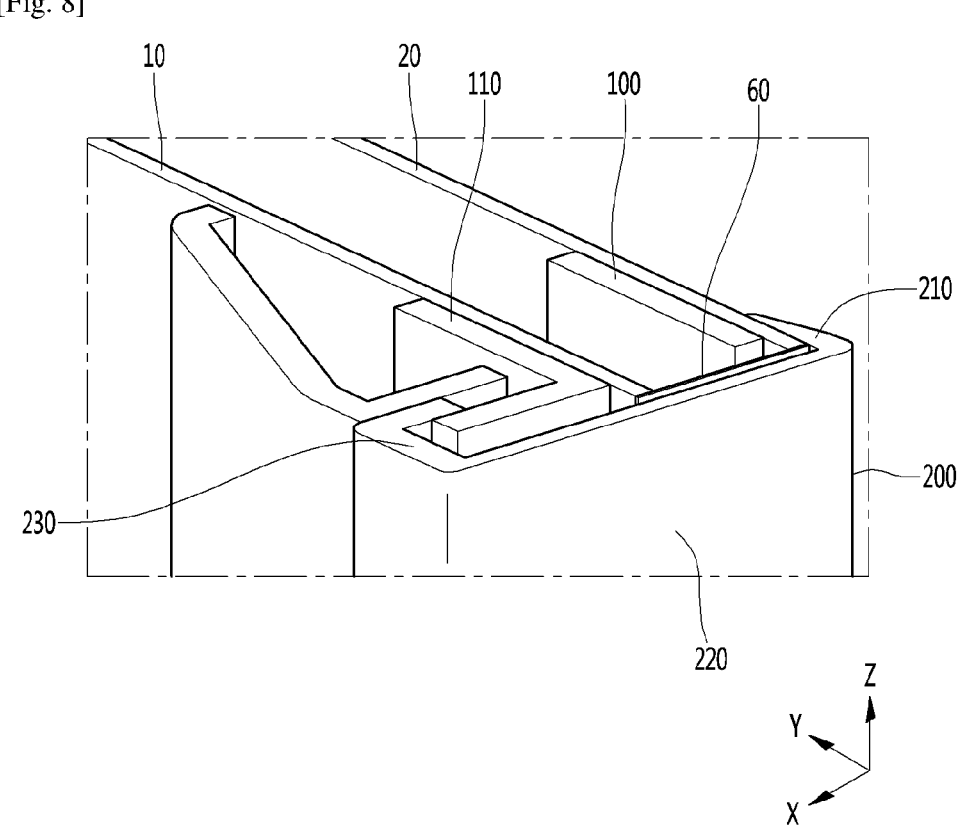

[Fig. 9]

[Fig. 10]
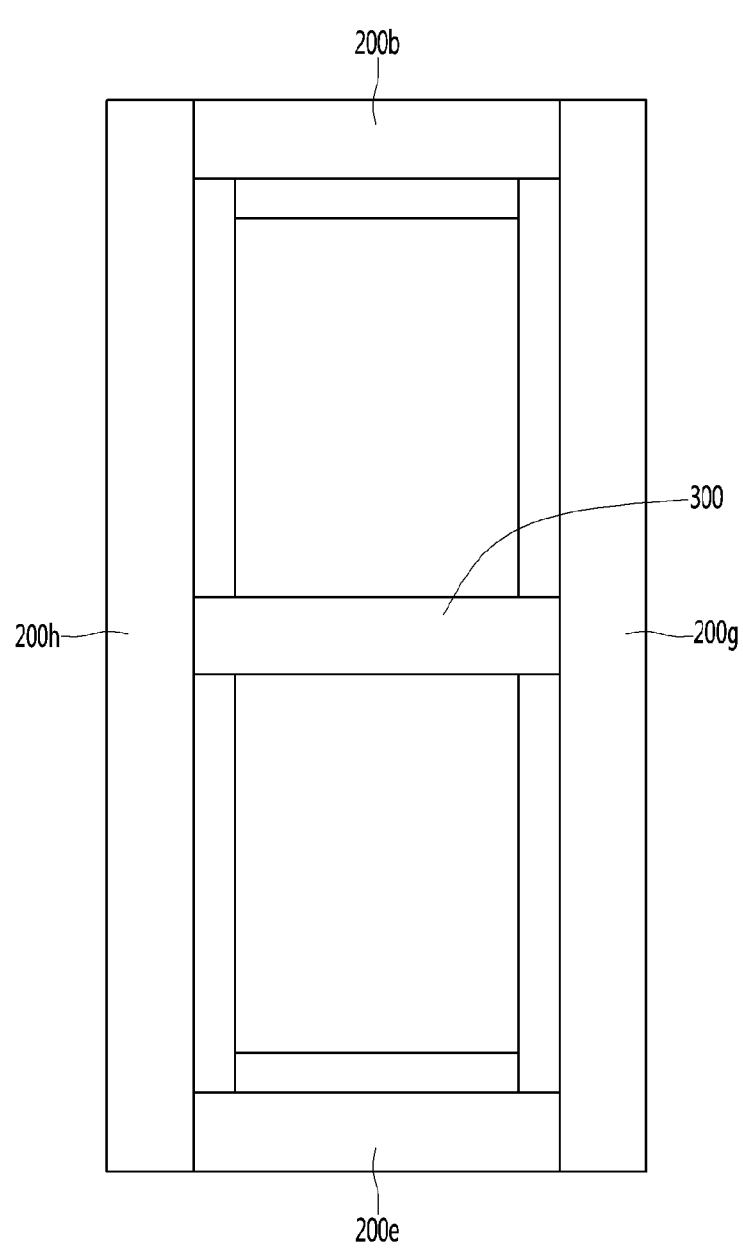

[Fig. 11]
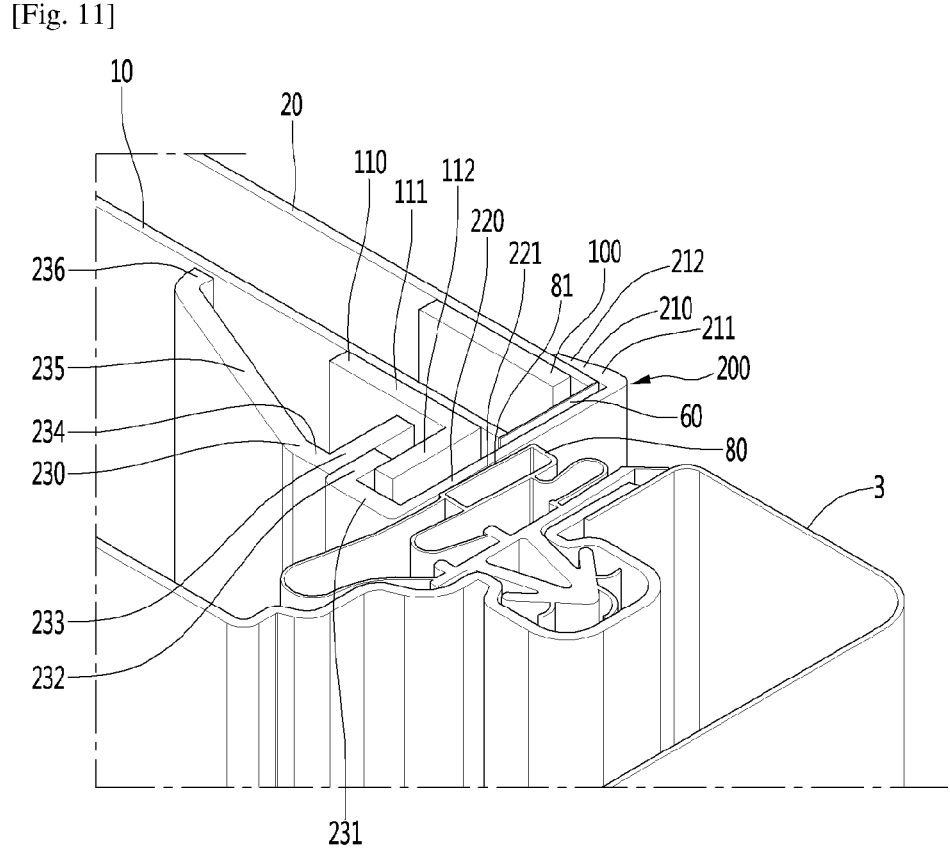

[Fig. 12]

[Fig. 13]
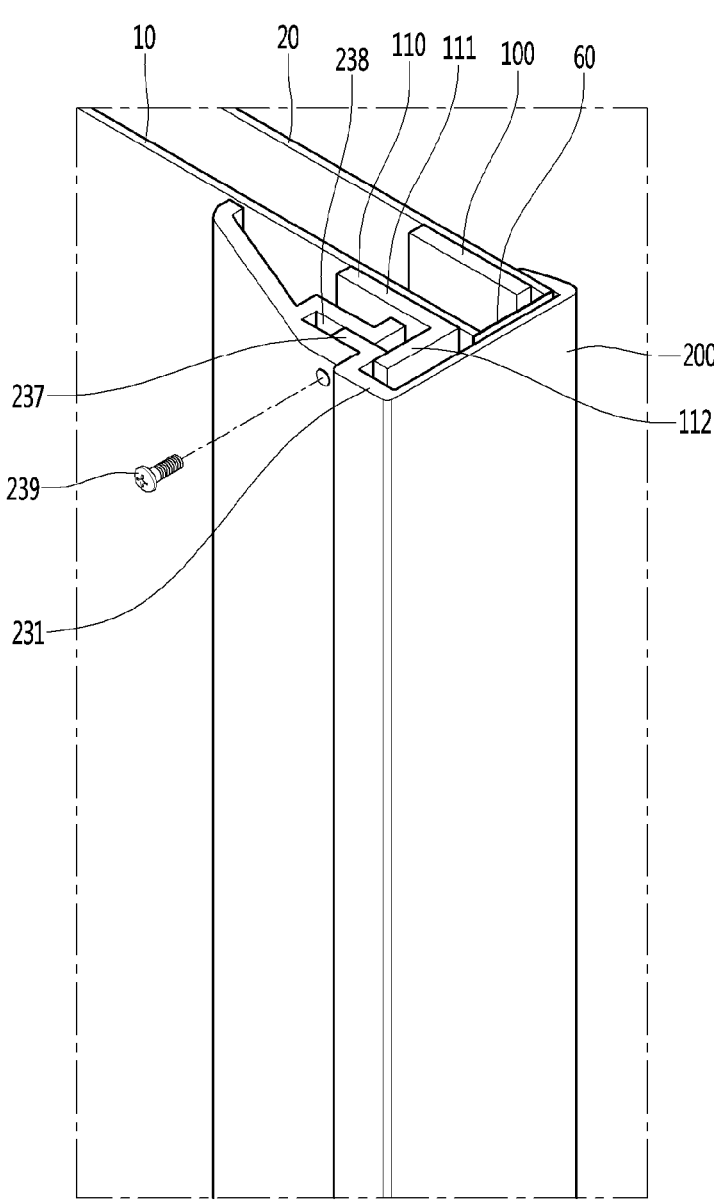

[Fig. 14]
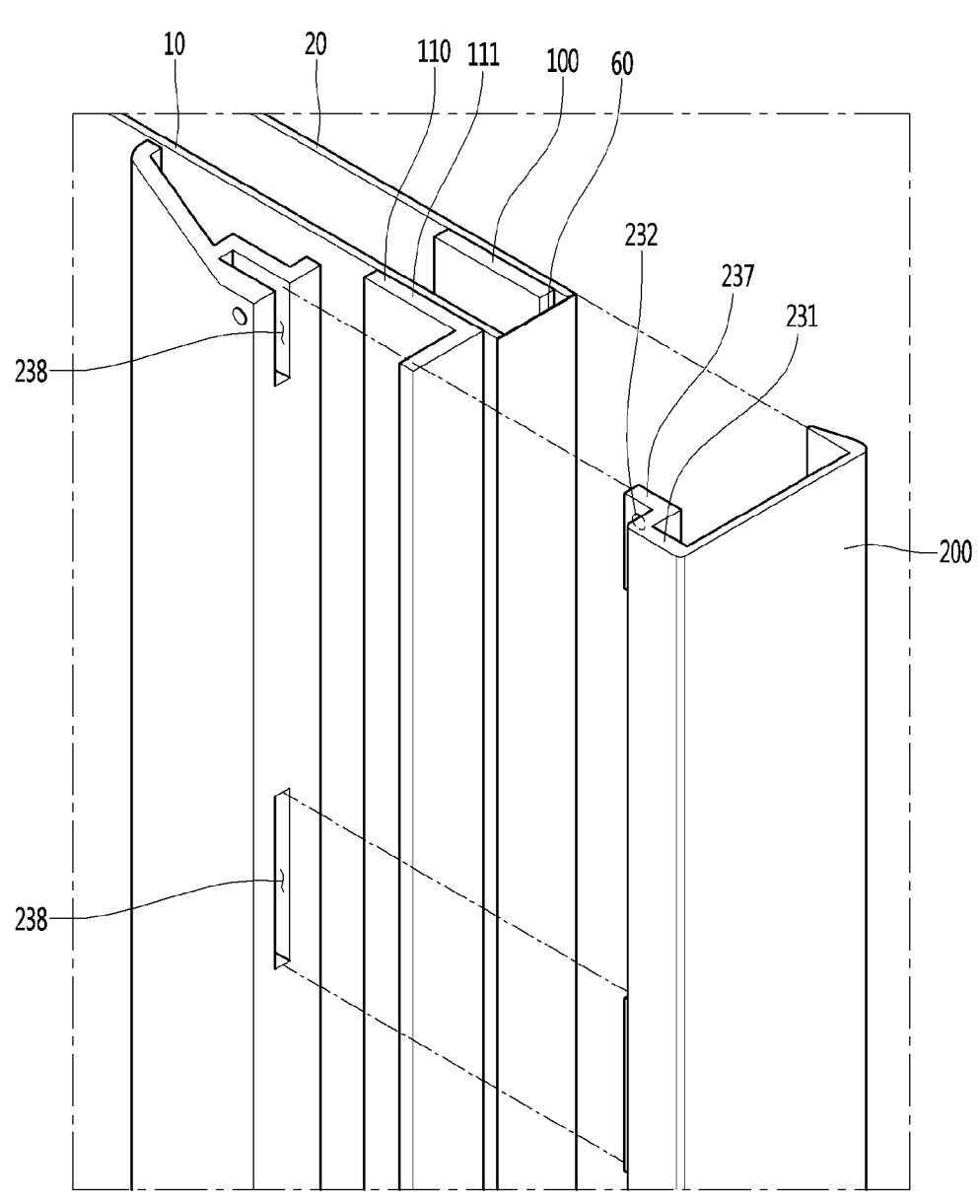

[Fig. 15]
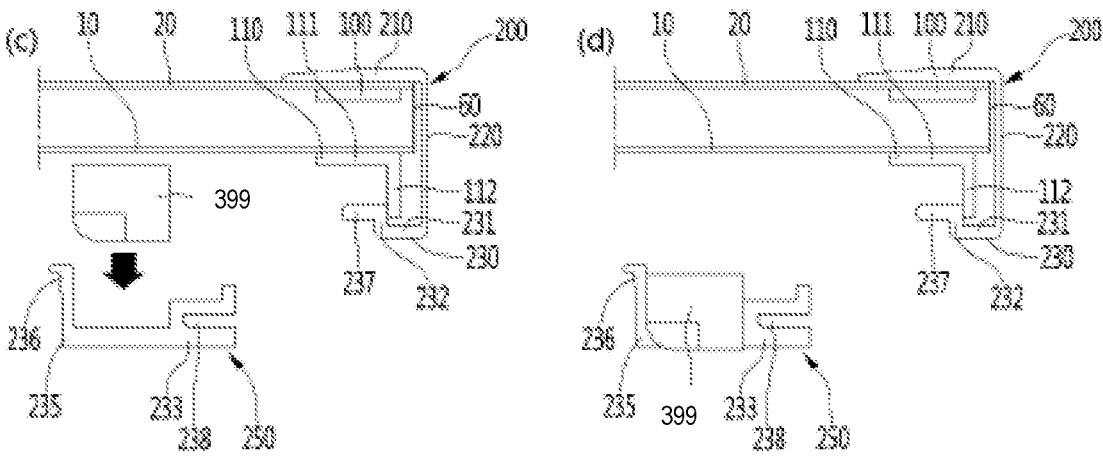
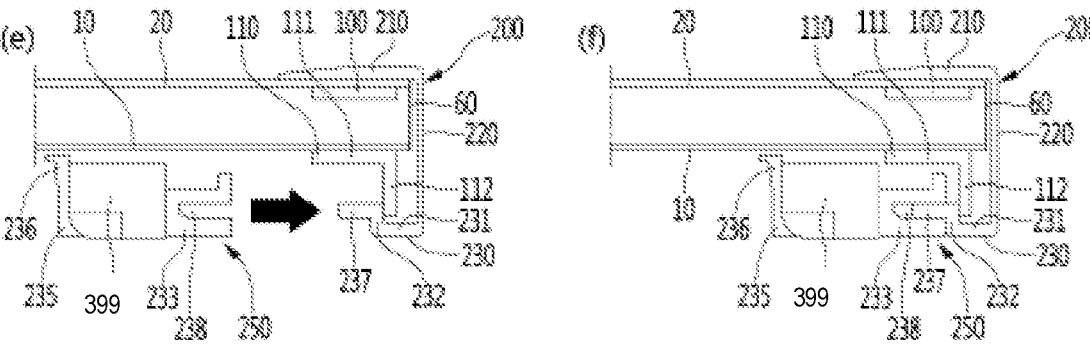

[Fig. 16]
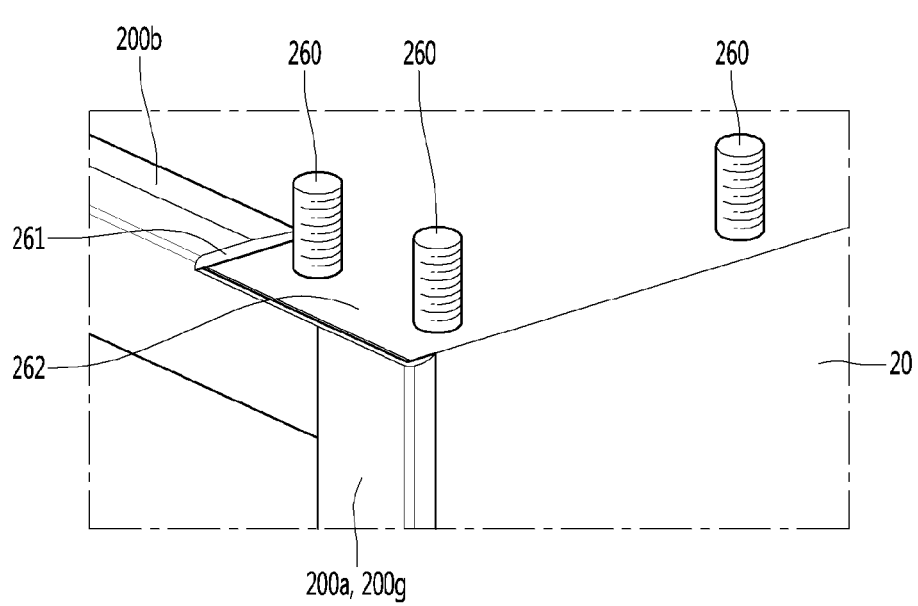
[Fig. 17]
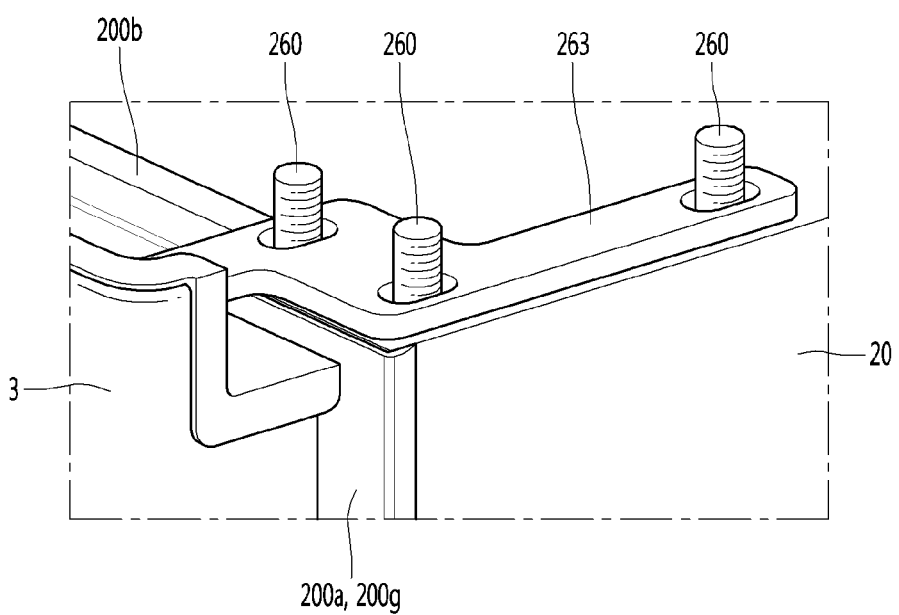

FIG. 18
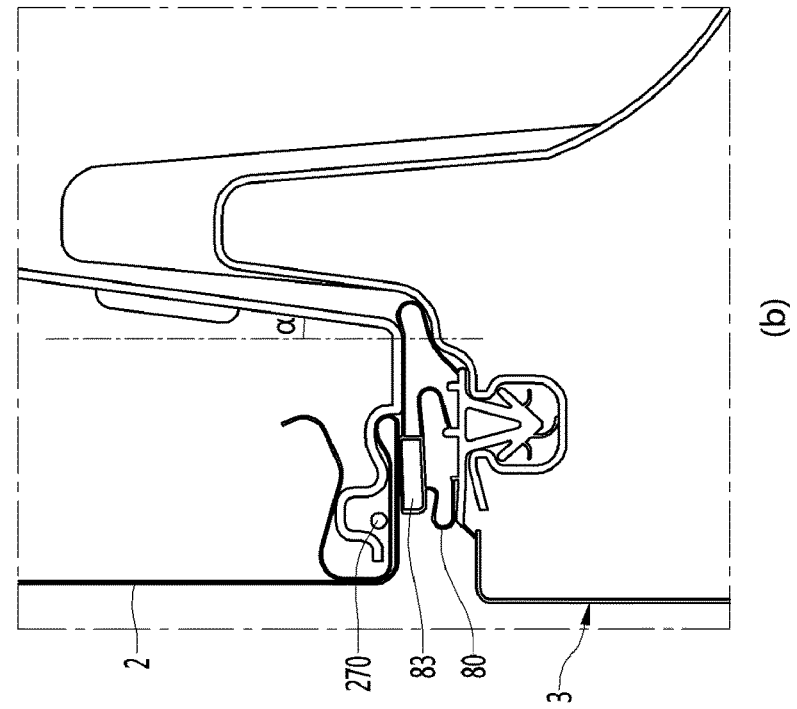
(b)
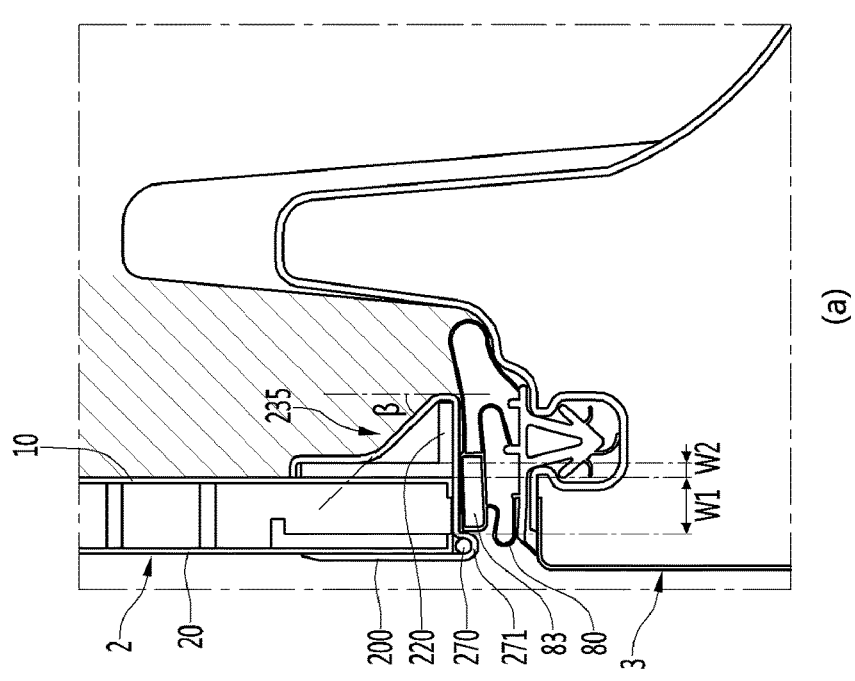
(a)

[Fig. 19]
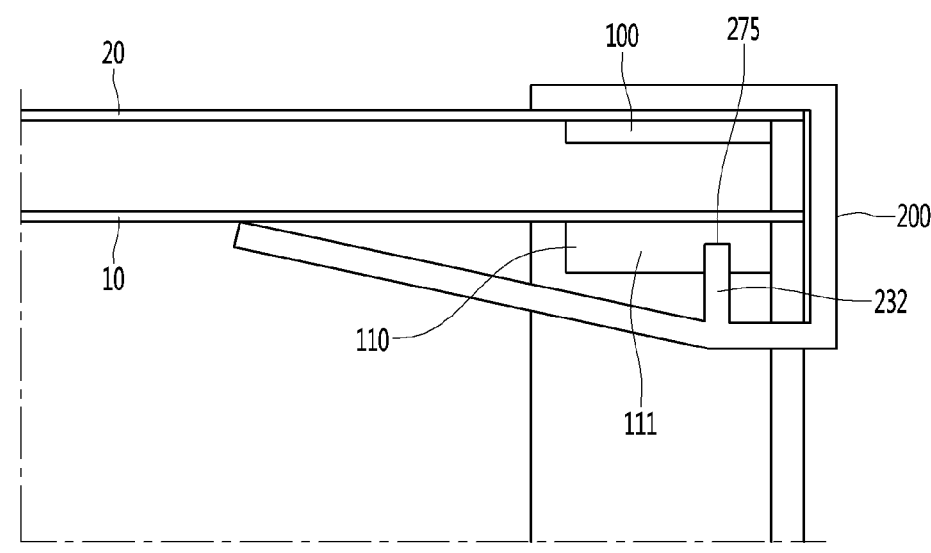
[Fig. 20]
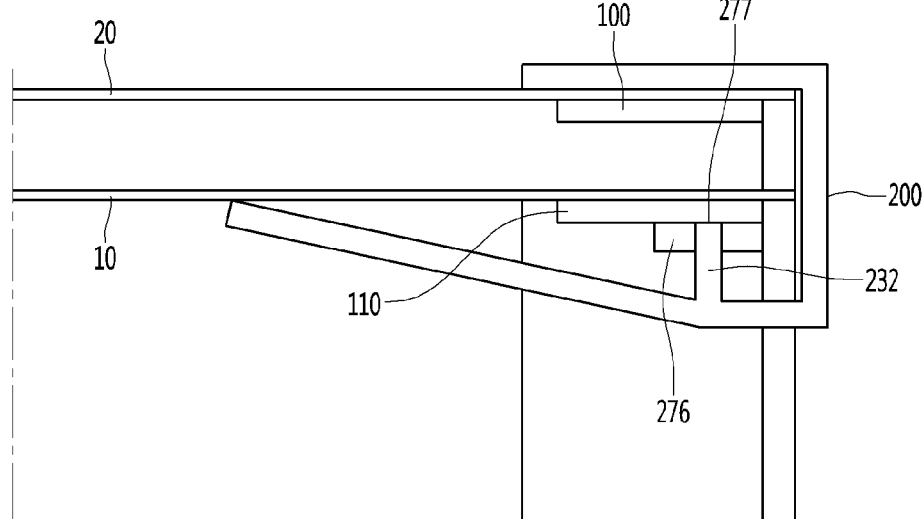

[Fig. 21]
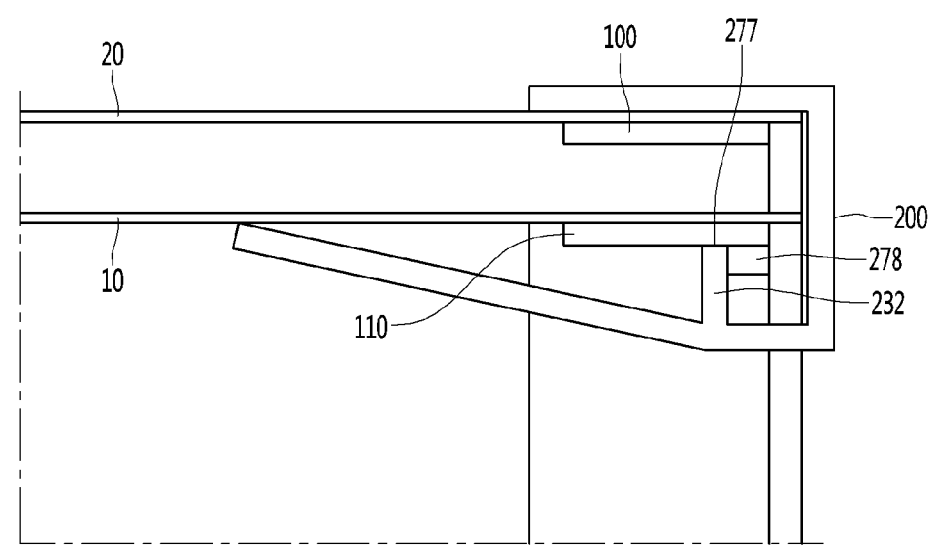
[Fig. 22]
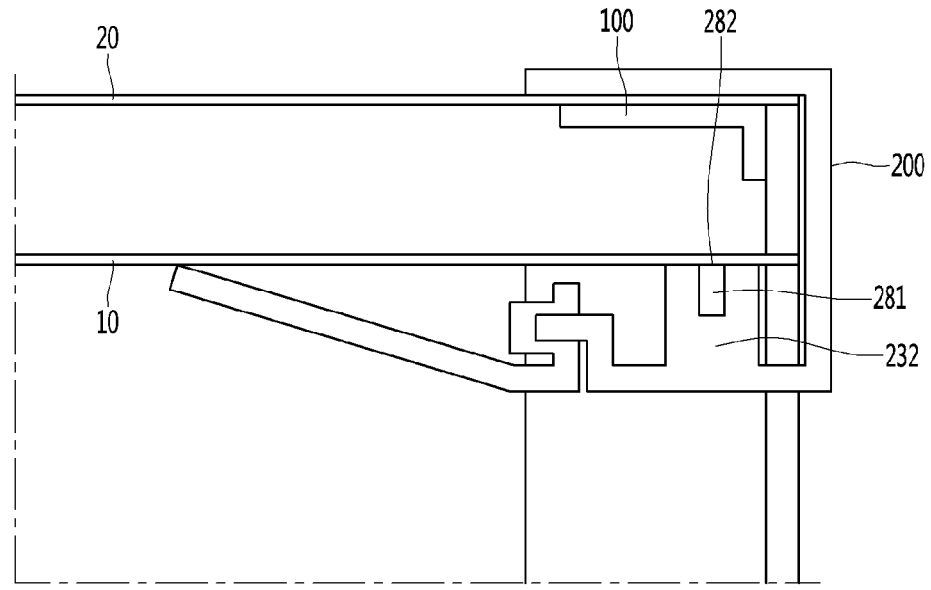

[Fig. 23]
[Fig. 24]
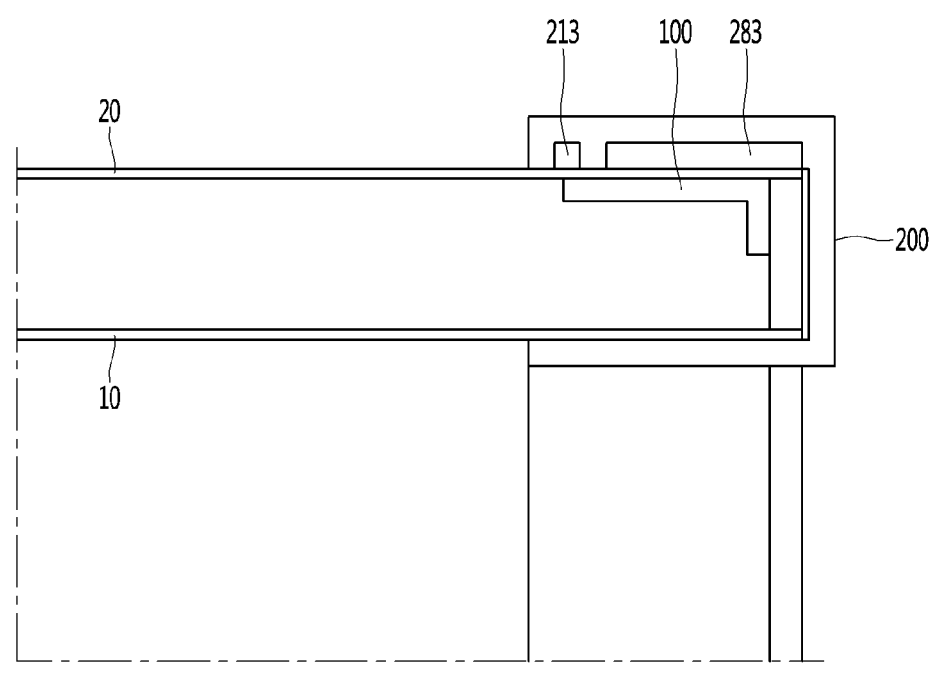

[Fig. 25]
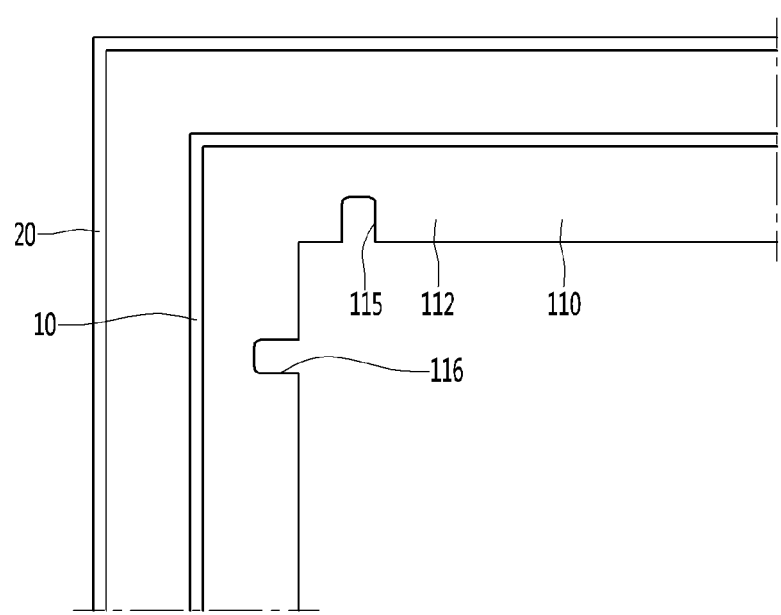
[Fig. 26]
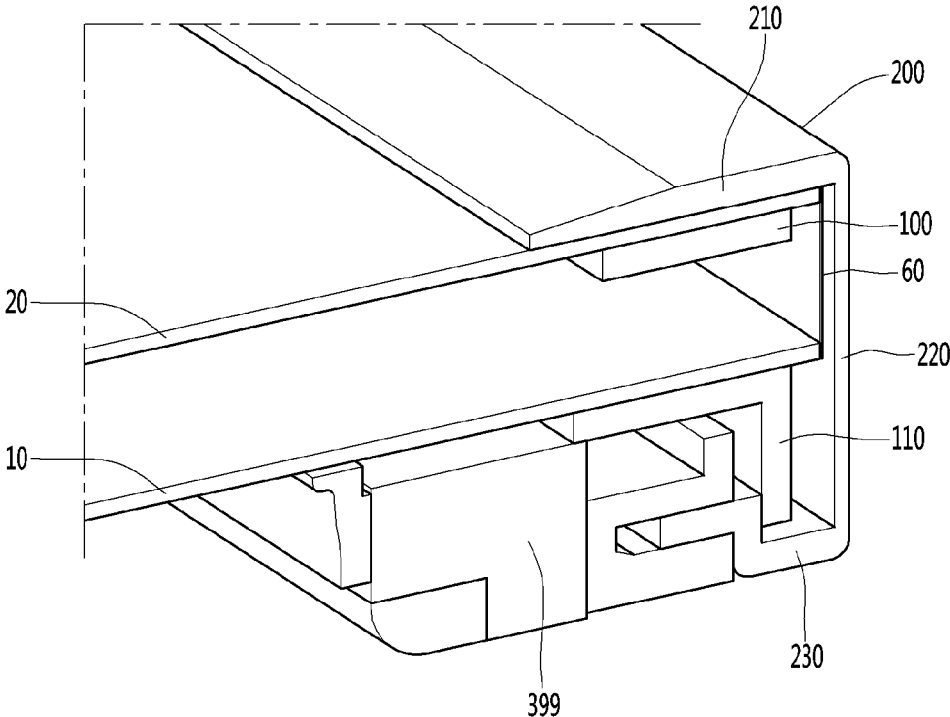

[Fig. 27]
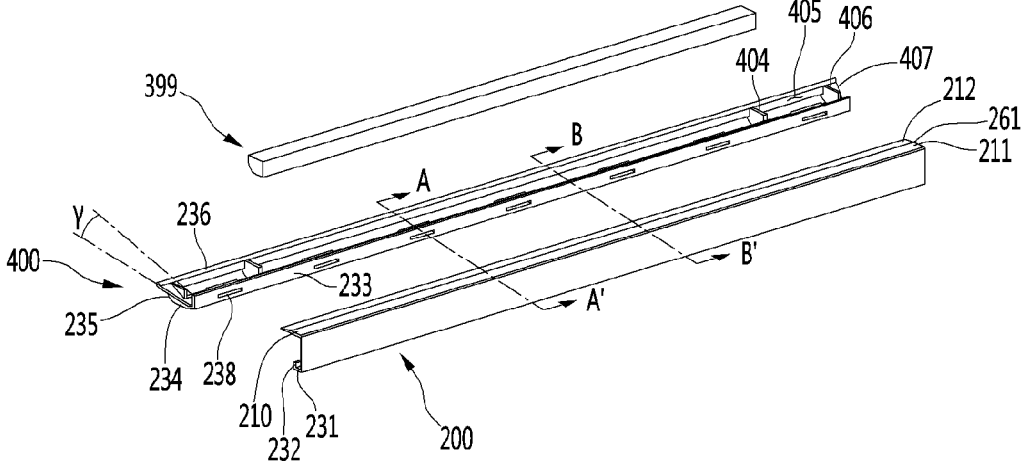
[Fig. 28]

[Fig. 29]
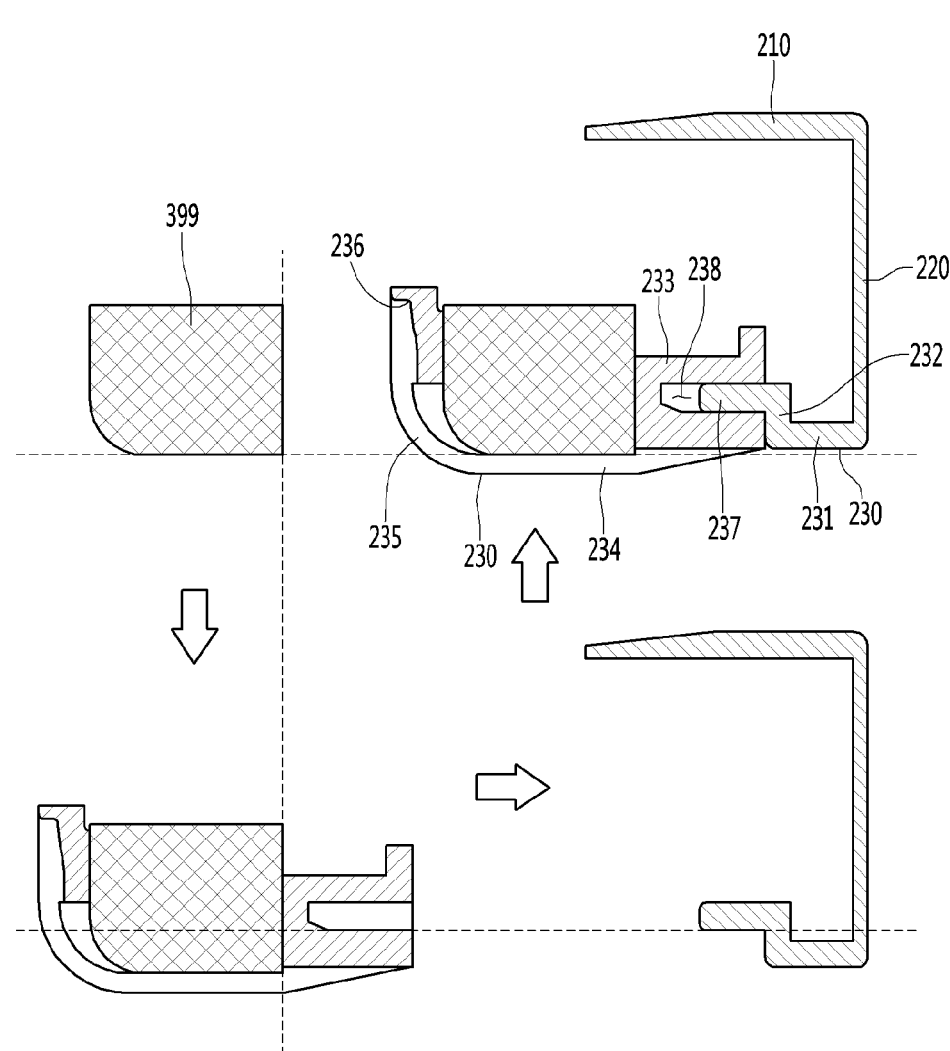

[Fig. 30]
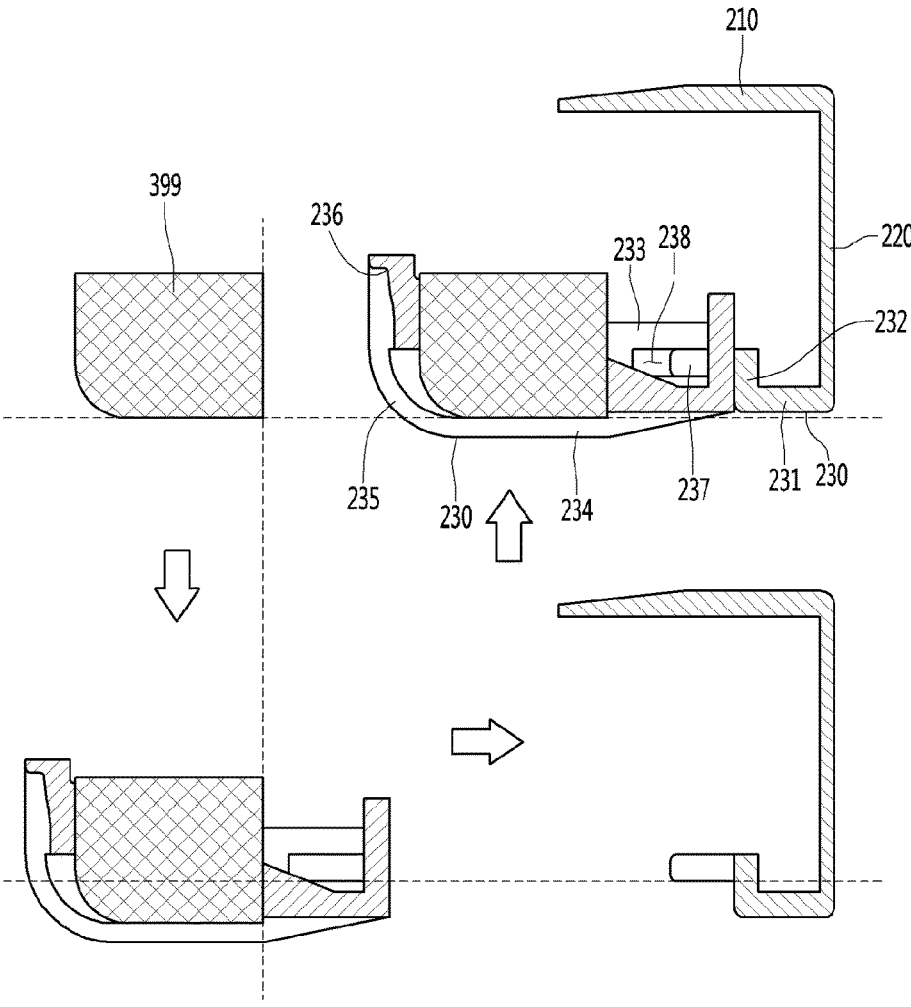
[Fig. 31]
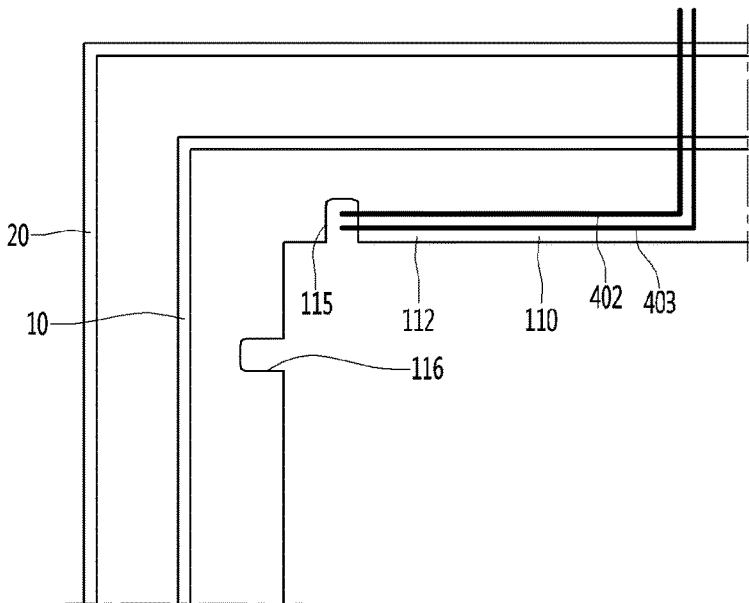

[Fig. 32]
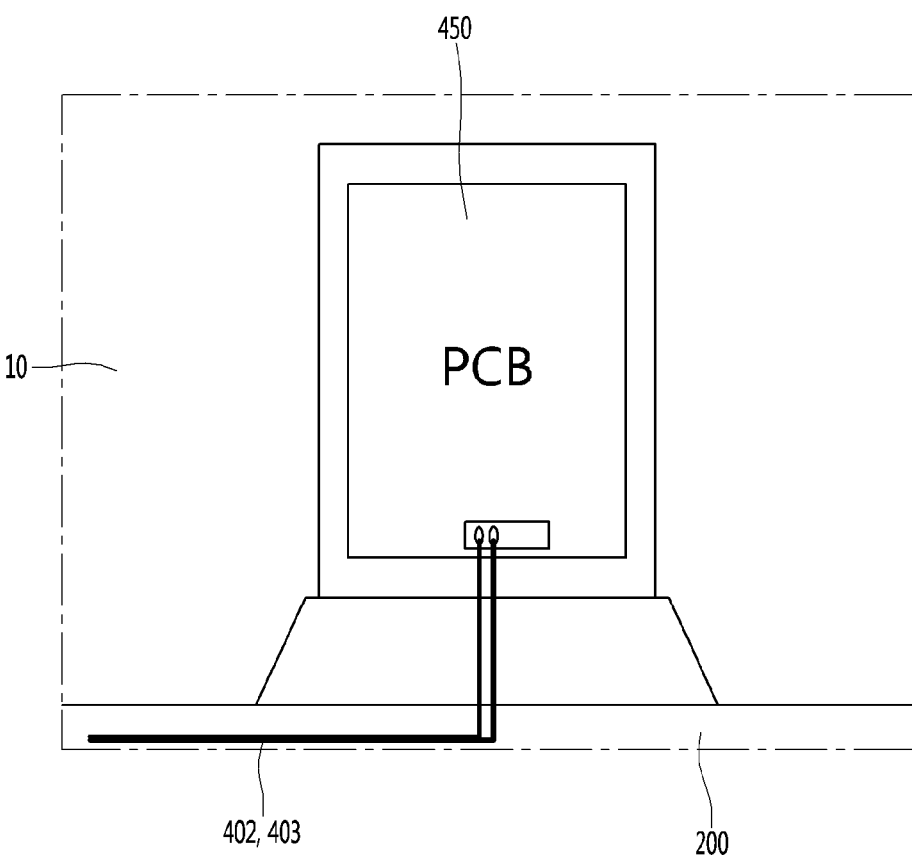
[Fig. 33]
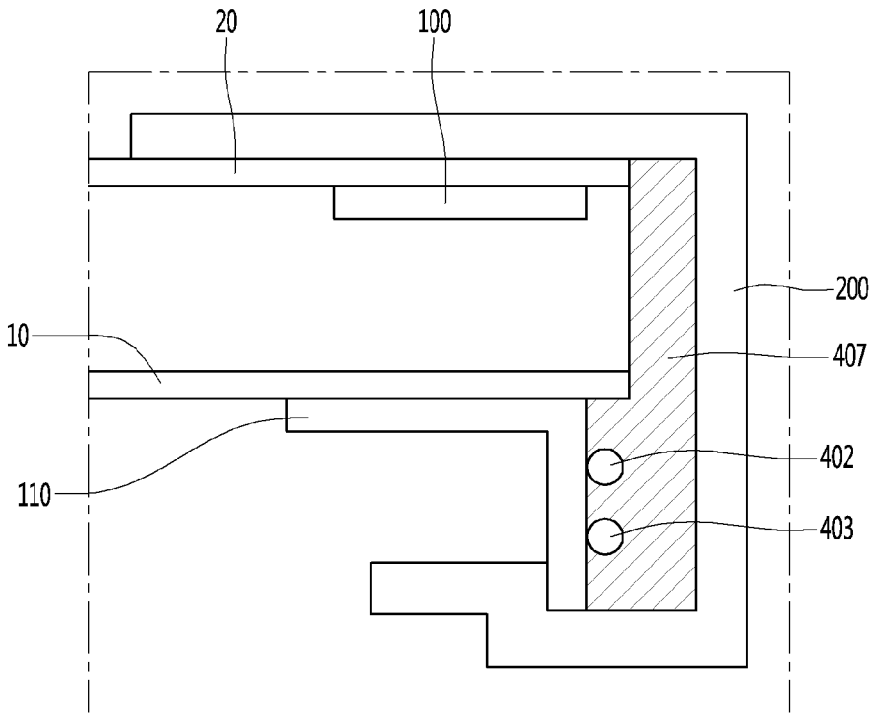

VACUUM ADIABATIC BODY AND REFRIGERATOR

CROSS-REFERENCE TO RELATED PATENT APPLICATIONS

This application is a continuation of U.S. patent application Ser. No. 16/766,215, filed May 21, 2020, which is a U.S. National Stage Application under 35 U.S.C. § 371 of PCT Application No. PCT/KR2018/015703, filed Dec. 11, 2018, which claims priority to Korean Patent Application No. 10-2017-0171630, filed Dec. 13, 2017, whose entire disclosures are hereby incorporated by reference. This application is related to copending U.S. application Ser. No. 16/766,562 filed on May 22, 2020, U.S. application Ser. No. 16/766,233 filed on May 21, 2020, U.S. application Ser. No. 16/768,379 filed on May 29, 2020, and U.S. application Ser. No. 16/767,899 filed on May 28, 2020, whose entire disclosures are also hereby incorporated by reference.

BACKGROUND

1. Field

The present disclosure relates to a vacuum adiabatic body and a refrigerator.

2. Background

A vacuum adiabatic body is a structure for suppressing heat transfer by providing a vacuum in the interior thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 mm or more is generally provided. However, the internal volume of the refrigerator is therefore reduced. In order to increase the internal volume of a refrigerator, there is an attempt to apply a vacuum adiabatic body to the refrigerator.

In a first example, Korean Patent No. 10-0343719 discloses a method in which a vacuum adiabatic panel is prepared and then built in walls of a refrigerator, and the exterior of the vacuum adiabatic panel is finished with a separate molding as Styrofoam (polystyrene). According to this method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material has been disclosed in Korean Patent Publication No. 10-2015-0012712. According to the technique described in this reference, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Publication No. US20040226956A1. However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of this reference is limited to cryogenic refrigerating apparatuses and may not be applied to refrigerating apparatuses used in general households.

As a further alternative, Korean Patent Application Publication No. 10-2017-0016187 discloses a vacuum adiabatic body and a refrigerator. The reference proposes a refrigerator in which both the main body and the door are provided as vacuum adiabatic bodies.

The vacuum adiabatic body itself only performs an adiabatic action, and necessary parts are required to be installed in a product such as a refrigerator to which the vacuum adiabatic body is applied, but there is no consideration about it.

BRIEF DESCRIPTION OF DRAWINGS

The embodiments will be described in detail with reference to the following drawings in which like reference numerals refer to like elements wherein:

FIG. 1 is a perspective view of a refrigerator according to an embodiment.

FIG. 2 is a view schematically showing a vacuum adiabatic body used in a main body and a door of the refrigerator.

FIG. 3 is a view showing various embodiments of an internal configuration of a vacuum space part.

FIG. 4 is a view showing various embodiments of conductive resistance sheets and peripheral portions thereof.

FIG. 5 illustrates graphs showing changes in adiabatic performance and changes in gas conductivity with respect to vacuum pressures by applying a simulation.

FIG. 6 illustrates graphs obtained by observing, over time and pressure, a process of exhausting the interior of the vacuum adiabatic body when a supporting unit is used.

FIG. 7 illustrates graphs obtained by comparing vacuum pressures and gas conductivities.

FIG. 8 is a sectional perspective view illustrating a peripheral portion of the vacuum adiabatic body.

FIGS. 9 and 10 schematically illustrate a front surface of the main body in a virtual state where the inner surface part is unfolded.

FIG. 11 is a sectional view illustrating a contact part illustrated in a state where the main body is closed by the door.

FIG. 12 is a sectional view illustrating a contact part of a main body and a door according to another embodiment.

FIG. 13 and FIG. 14 are partial cutaway perspective views illustrating an inner surface part, wherein FIG. 13 is a view illustrating a state where fastening thereof is completed and FIG. 14 is a view illustrating a fastening process thereof.

FIG. 15 is a view for sequentially explaining fastening of a sealing frame in a case of an embodiment in which the sealing frame is provided as two members;

FIG. 16 and FIG. 17 are views illustrating any one end portion of the sealing frame, wherein FIG. 16 is a view illustrating before the door hinge is installed, and FIG. 17 is a view illustrating a state where the door hinge is installed.

FIG. 18 is a view for explaining the effect of the sealing frame according to the present disclosure in comparison with the technique of the related art, wherein FIG. 18 (section a) is a sectional view illustrating a contact part between a main body-side vacuum adiabatic body and a door according to the present disclosure, and FIG. 18

(section b) is a sectional view illustrating the main body and the door according to the related art.

FIGS. 19 to 24 are views illustrating various embodiments in which a sealing frame is installed;

FIG. 25 is a view observing the upper right side of the main body-side vacuum adiabatic body from the front.

FIGS. 26 and 27 are sectional views illustrating a corner portion of the vacuum adiabatic body in a state where the lamp is installed, wherein FIG. 26 is a sectional view illustrating a portion through which the wiring of the lamp does not pass, and FIG. 27 is a sectional view illustrating a portion through which the wiring of the lamp passes.

FIG. 28 is an exploded perspective view illustrating a peripheral portion of the part.

FIGS. 29 and 30 are sectional views taken along line A-A' and line B-B' in FIG. 28.

FIG. 31 is a view observing a side portion of the upper side part of the refrigerator from the front.

FIG. 32 is a schematic view illustrating an upper surface of a refrigerator from outside.

FIG. 33 is a sectional view illustrating an upper end part of the refrigerator.

DETAILED DESCRIPTION

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
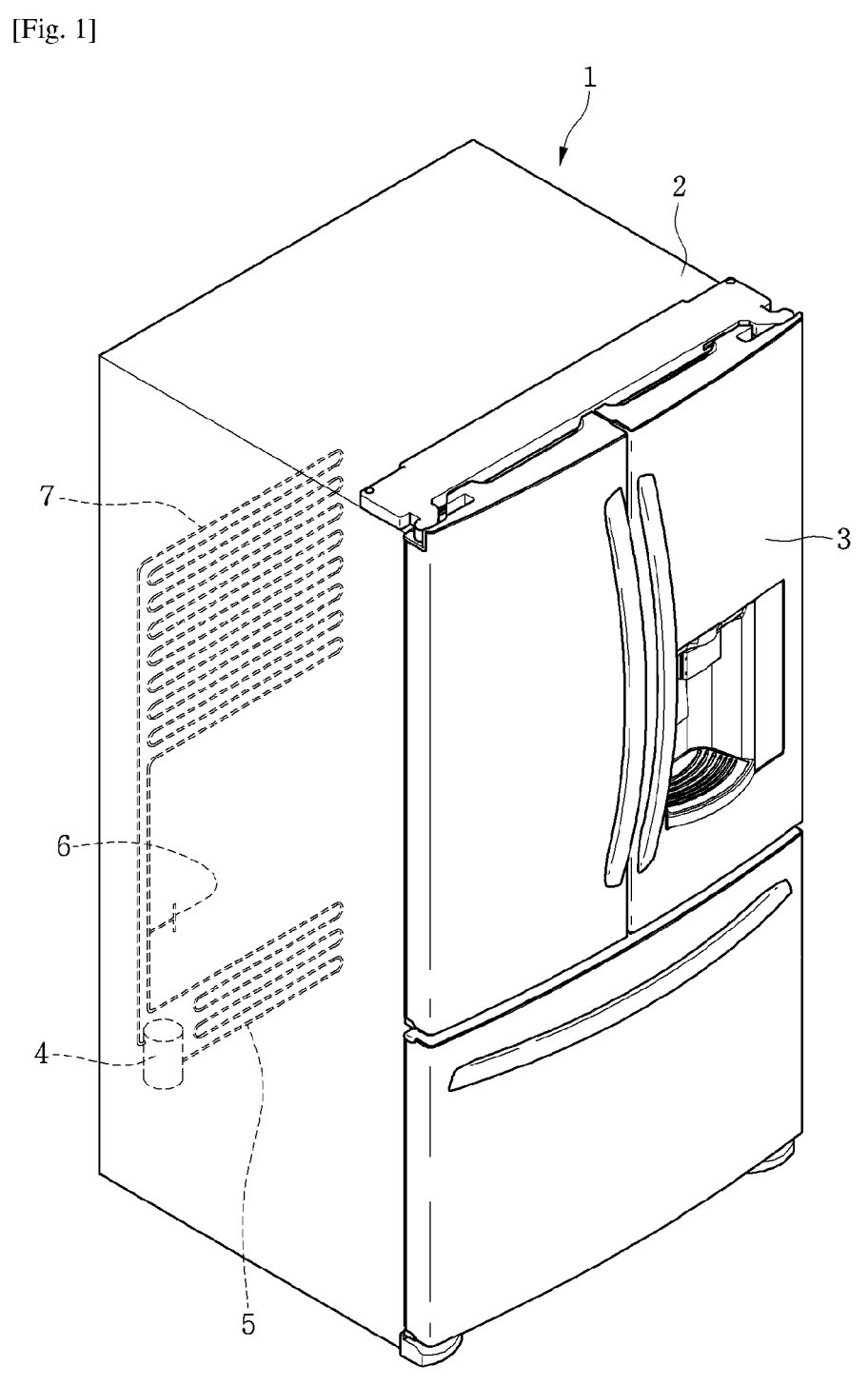

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber or a freezing chamber.

The refrigerator 1 includes parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and air blown from the fan may pass through the evaporator 7 and then into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (or first plate layer) 10 for providing a wall of a low-temperature space (e.g., an interior of the refrigerator 1, a second plate member (or second plate layer) 20 for providing a wall of a high-temperature space (e.g., an exterior of the refrigerator 1), a vacuum space part (or space) 50 defined as a gap part between the first and second plate members 10 and 20. Also, the vacuum adiabatic body includes the conductive resistance sheets 60 and 63 for preventing heat conduction between the first and second plate members 10 and 20. A sealing part (or sheet) 61 for sealing the first and second plate members 10 and 20 is provided such that the vacuum space part 50 is in a sealed state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space. Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part. First, referring to FIG. 3 (section a), the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. A material of the supporting unit 30 may include a resin selected from the group consisting of PC, glass fiber PC, low outgassing polycarbonate (PC), polyphenylene sulfide (PPS), and liquid crystal polymer (LCP) so as to obtain high compressive strength, low outgassing and water absorbance, low thermal conductivity, high compressive strength at high temperature, and excellent machinability.

The supporting unit 30 includes bars 31. The bars 31 may extend in a direction substantially perpendicular to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3 (section b), the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer. In this embodiment, the vacuum adiabatic body can be fabricated without using the radiation resistance sheet 32.

Referring to FIG. 3 (section c), the supporting unit 30 maintaining the vacuum space part 50 man not be provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30. A case where the porous substance 33 is filled in the vacuum space part 50 will be described in detail later.

FIG. 4 is a view showing various embodiments of the conductive resistance sheets and peripheral portions thereof. Structures of the conductive resistance sheets are briefly illustrated in FIG. 2, but will be understood in detail with reference to FIG. 4. First, a conductive resistance sheet proposed in FIG. 4 (section a) may be preferably applied to the main body-side vacuum adiabatic body. Specifically, the first and second plate members 10 and 20 are to be sealed so as to allow a vacuum to be formed in the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts (or sealing regions) 61 at which both ends of the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding spots. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as caulking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. So as to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4 (section b) may be preferably applied to the door-side vacuum adiabatic body. In FIG. 4 (section b), portions different from those of FIG. 4 (section a) are described in detail, and the same description is applied to portions identical to those of FIG. 4 (section a). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side part of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4 (section c) may be preferably installed in the pipeline passing through the vacuum space part. In FIG. 4 (section c), portions different from those of FIGS. 4a and 4b are described in detail, and the same description is applied to portions identical to those of FIGS. 4 (section a) and 4 (section b). A conductive resistance sheet having the same shape as that of FIG. 4a, preferably, a wrinkled or folded conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4 (section a). Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may correspond to about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Equation 1.

$$eK\text{solid conduction heat} > eK\text{radiation transfer heat} > eK\text{gas conduction heat} \qquad \text{Equation 1:}$$

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference ΔT1 between a geometric center formed by adjacent bars 31 and a point at which each of the bars 31 is located may be preferably provided to be less than 0.5° C. Also, a temperature difference ΔT2 between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact.

The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength than the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness. Even when the porous substance 33 is provided in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described. FIG. 5 illustrates graphs showing changes in adiabatic performance and changes in gas conductivity with respect to vacuum pressures by applying a simulation. Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 6 illustrates graphs obtained by observing, over time and pressure, a process of exhausting the interior of the vacuum adiabatic body when the supporting unit is used. Referring to FIG. 6, in order to cause the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the vacuum space part 50 is disconnected from the vacuum pump, and heat is applied to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10{-}6$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10{-}6$ Torr.

FIG. 7 illustrates graphs obtained by comparing vacuum pressures and gas conductivities. Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10{-}1$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10{-}3$ Torr. The vacuum pressure of $4.5 \times 10{-}3$ Torr can be defined as the point at which the reduction in adiabatic effect caused by gas conduction heat is saturated. Also, when the effective heat transfer coefficient is 0.1 W/mK, the vacuum pressure is $1.2 \times 10{-}2$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10{-}4$ Torr. Also, the vacuum pressure at the point at which the reduction in adiabatic effect caused by gas conduction heat is saturated is approximately $4.7 \times 10{-}2$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is middle between the vacuum pressure when only the supporting unit is used and the vacuum pressure when only the porous substance is used. In a case where only the porous substance is used, the lowest vacuum pressure can be created and used.

FIG. 8 is a sectional perspective view illustrating the peripheral portion of the vacuum adiabatic body. Referring to FIG. 8, a first plate member 10, a second plate member 20, and a conductive resistance sheet 60 are provided. The conductive resistance sheet 60 may be provided as a thin plate to resist thermal conduction between the plate members 10 and 20. The conductive resistance sheet 60 is provided as a thin plate and is provided as a flat surface in the drawing, but may be pulled inward to have a curved shape when vacuum is applied to the vacuum space part 50.

Since the conductive resistance sheet 60 is in the form of a thin plate and has low strength, the conductive resistance sheet can be broken even by a small external impact. When the conductive resistance sheet 60 is broken, the vacuum of the vacuum space part is destroyed and the performance of the vacuum adiabatic body is not exerted. So as to solve this problem, a sealing frame (or first frame) 200 may be provided on the outer surface of the conductive resistance sheet 60. According to the sealing frame 200, since the parts of the door 3 or other external products indirectly contacts the conductive resistance sheet 60 through the sealing frame 200 without directly contacting the conductive resistance sheet 60, the breakage of the conductive resistance sheet 60 can be prevented. In order that the sealing frame 200 does not transfer an impact to the conductive resistance sheet 60, the gap between the two members may be spaced from each other and a buffer member may be interposed therebetween.

So as to reinforce the strength of the vacuum adiabatic body, the plate members 10 and 20 may be provided with a reinforcing member. For example, the reinforcing member may include a first reinforcing member (or reinforcement plate or beam) 100 fastened to a peripheral portion of the second plate member 10 and a second reinforcing member (or second reinforcing plate or beam) 110 fastened to a peripheral portion of the first plate member 10. As the reinforcing members 100 and 110, a member can be applied which may be thicker or have a higher strength than the plate members 10 and 20 to such an extent that the strength of the vacuum adiabatic body can be increased. The first reinforcing member 100 may be provided in the inner space of the vacuum space part 50, and the second reinforcing member 110 may be provided on the inner surface part of the main body 2.

It is preferable that the conductive resistance sheet 60 is not in contact with the reinforcing members 100 and 110. This is because the thermal conductive resistance characteristic generated in the conductive resistance sheet 60 is destroyed by the reinforcing member. In other words, this is because the width of the narrow heat bridge for resisting the heat conduction is greatly expanded by the reinforcing member, and the narrow heat bridge characteristic is destroyed.

Since the width of the internal space of the vacuum space part 50 is narrow, the section of the first reinforcing member 100 may be provided in a flat plate shape. The second reinforcing member 110 provided on the inner surface of the main body 2 may be provided in a shape in which the section thereof is bent.

The sealing frame 200 may include an inner surface part (or inner surface wall) 230 which is placed in an inner space of the main body 2 and supported by the first plate member 10, an outer surface part (or outer surface wall) 210 which is placed in an outer space of the main body 2 and supported by the second plate member 20, and a side surface part (or side surface wall) 220 which is placed in a side surface of a peripheral portion of the vacuum adiabatic body constituting the main body 2, covers the conductive resistance sheet 60, and connects the inner surface part 230 and the outer surface part 210.

The sealing frame 200 may be made of a resin that permits slight deformation. The mounting position of the sealing frame 200 can be maintained by an interaction between the inner surface part 230 and the outer surface part 210, that is, by a catching action therebetween. In other words, the setting position of the sealing frame may not deviate.

The fixing position of the sealing frame 200 will be described in detail. First, the movement of the plate members 10 and 20 in the extending direction (y-axis direction in FIG. 8) on the plane may be fixed by the inner surface part 230 being engaged with and supported by the second reinforcing member 110. More specifically, the position movement of the sealing frame 200 falling out from the vacuum adiabatic body to the outside may cause the inner surface part 230 to be engaged with the second reinforcing member 110 and be interrupted. On the contrary, the position movement of the sealing frame 200 moving to the inside of the vacuum adiabatic body may be interrupted by at least one of, firstly, the action of the inner surface part 230 to be engaged with and supported by the second reinforcing member 110 (this action can be acted in both directions including an elastic restoring force of the sealing frame provided as resin), secondly the action of the side surface part 220 to be stopped with respect to the plate parts 10 and 20, and thirdly the action of the movement of the inner surface part 230 with respect to the first plate member 10 in the y-axis direction to be blocked.

The movement of the plate members 10 and 20 in a direction extending perpendicular to the end surfaces of the plate members 10 and 20 (x-axis direction in FIG. 8) may be fixed by the outer surface part 210 being engaged to and supported by the second plate member 20. As an auxiliary action, the movement of the plate members 10 and 20 in the x-axis direction may be interrupted by the action of the inner surface part 230 to hold the second reinforcing member 110 and the action of contacting the inner surface part 230 with the second reinforcing member 110.

The movement of the sealing frame 200 in the extending direction (z-axis direction in FIG. 8) can be stopped by at least one of the first action of the inner surface part 230 of anyone sealing frame 200 to be in contact with the inner surface part of the other sealing frame 200 and a second action that the inner surface part 230 of anyone sealing frame 200 is in contact with the mullion 300.

Figure 9:
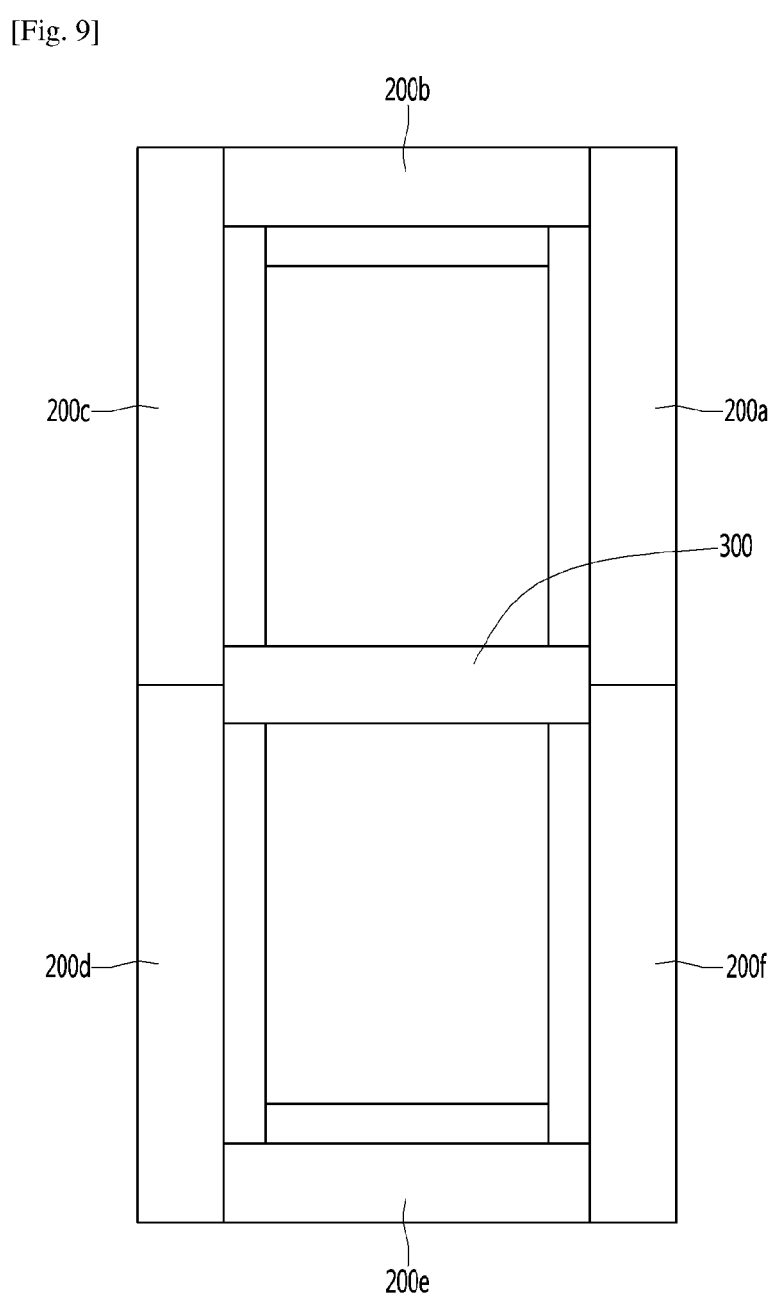

FIGS. 9 and 10 schematically illustrate the front face of the main body, and, in the drawing, it should be noted that the sealing frame 200 is in a virtual state where the inner surface part 230 is unfolded in a direction parallel to the side surface part 220. Referring to FIGS. 9 and 10, the sealing frame 200 may include members 200b and 200e which seal the upper and lower peripheral portions of the main body 2, respectively. The side peripheral portions of the main body 2 can be divided according to whether the spaces in the refrigerator divided based on the mullion 300 are sealed separately (in a case of FIG. 9) or integrally (in a case of FIG. 10).

In a case where the side peripheral portions of the main body 2 are separately sealed as illustrated in FIG. 9, it can be divided into four sealing frames 200a, 200c, 200d, and 200f. In a case where the side peripheral portions of the main body 2 are integrally sealed as illustrated in FIG. 10, it can be divided into two sealing frames 200g and 200c.

In a case where the side peripheral portions of the main body 2 are sealed by the two sealing frames 200g and 200c as illustrated in FIG. 10, since the two fastening operations are required, the manufacturing is facilitated, but, it is necessary to cope with a fear of loss of cold air by occurring heat transfer between the separated storehouses with heat conduction of the sealing frame. In a case where the side peripheral portions of the main body 2 are sealed by the four sealing frames 200a, 200c, 200d, and 200f as illustrated in FIG. 9, since it is required four fastening operations, the manufacturing is inconvenient, but, heat conduction between the sealing frames is obstructed, and heat transfer between the separated storehouses is reduced, thereby reducing the loss of cold air.

Meanwhile, the embodiment of the vacuum adiabatic body illustrated in FIG. 8 can preferably exemplify a main body-side vacuum adiabatic body. However, it does not exclude that the sealing frame 200 is provided to the door-side vacuum adiabatic body. However, in general, since the gasket is provided on the door 3, it is more preferable that the sealing frame 200 is provided on the main body-side vacuum adiabatic body. In this case, the side surface part 220 of the sealing frame 200 can have a further advantage that the side surface part 220 can provide a width sufficient for the gasket to contact.

In detail, the width of the side surface part 220 is provided to be wider than the adiabatic thickness of the vacuum adiabatic body, that is, the width of the vacuum adiabatic body, so that the adiabatic width of the gasket can be provided sufficiently wide. For example, in a case where the adiabatic thickness of the vacuum adiabatic body is 10 mm, it is possible to provide a large storage space in the refrigerator, thereby increasing the accommodation space of the refrigerator. However, there is a problem that, in a case where the adiabatic thickness of the vacuum adiabatic body is 10 mm, a gap sufficient for the gasket to contact cannot be provided. In this case, since the side surface part 220 can provide a wide gap corresponding to the contact area of the gasket, it is possible to effectively prevent the loss of the cold air through the contact gap between the main body 2 and the door 3. In other words, in a case where the contact width of the gasket is 20 mm, even if the adiabatic thickness of the vacuum adiabatic body is 10 mm, the width of the side surface part 220 can be provided to be 20 mm or more in correspondence with the contact width of the gasket.

Preferably, the length of the side surface part 220 is larger than the width of the conductive resistance sheet so that the sealing frame covers and protects the conductive resistance sheet. It can be understood that the sealing frame 200 performs the function of sealing to prevent shielding of the conductive resistance sheet and loss of cold air.

FIG. 11 is a sectional view illustrating the contact part illustrated in a state where the main body is closed by the door. Referring to FIG. 11, the gasket 80 is interposed in a boundary surface between the main body 2 and the door 3. The gasket 80 can be fastened to the door 3 and can be provided as a deformable member as a flexible material. The gasket 80 includes a magnet as one part and when the magnet pulls and approaches the magnetic body (i.e., magnetic body of peripheral portion of main body), the contact surface between the main body 2 and the door can block the leakage of the cold air by the sealing surface having a predetermined width by the action of the gasket 80 being smoothly deformed.

Specifically, when the gasket sealing surface 81 of the gasket is in contact with the side surface part 220, the side surface part sealing surface 221 having a sufficient width can be provided. The side surface part sealing surface 221 may be defined as a contact surface on the side surface part 220 which is correspondingly in surface contact with the gasket sealing surface 81 when the gasket 80 is in contact with the side surface part 220.

According to this, it is possible to provide sealing surfaces 81 and 221 having a sufficient area regardless of the adiabatic thickness of the vacuum adiabatic body. This is because even if the adiabatic thickness of the vacuum adiabatic body is narrow, for example, even if the adiabatic thickness of the vacuum adiabatic body is narrower than the gasket sealing surface 81, the width of the side surface part 220 may be increased, and the side surface part sealing surface 220 having a sufficient width can be obtained. In addition, regardless of the deformation of the member which may affect the deformation of the contact surface between the main body and the door, the sealing surfaces 81 and 221 having a sufficient area can be secured. This is because it is possible to provide a predetermined clearance in and out of the side surface part sealing surface 221 in designing the side surface part 220 so that even if slight deformation occurs between the sealing surfaces 81 and 221, the width and area of the sealing surface can be maintained.

In the sealing frame 200, the outer surface part 210, side surface part 220, and the inner surface part 230 are provided so that the set position thereof can be maintained. Simply, the outer surface part 210 and the inner surface part 230 has a pursing shape, that is, the structure of a concave groove, so that the configuration which holds the end portion of the vacuum adiabatic body, more precisely, the plate members 10 and 20 can be provided. Here, It can be understood that the concave groove has a configuration in which the width between the end portion of the outer surface part 210 and the end portion of the inner surface part 230 is smaller than the width of the side surface part 220.

The fastening of the sealing frame 200 will be briefly described. Firstly, the side surface part 220 and the outer surface part 210 is rotated in a direction of the second plate 20 in a state where the inner surface part 230 is engaged with the second reinforcing member 110. Then, the sealing frame 200 is elastically deformed, and the outer surface part 210 moves inward along the outer surface of the second plate member 20 so that the fastening can be completed. When the fastening of the sealing frame 200 is completed, the sealing frame 200 can be restored to the original shape thereof designed before the deformation. When the fastening is completed, the installation position thereof can be maintained as described above.

The detailed configuration and detailed action of the sealing frame 200 will be described. The outer surface part 210 may include an extension part (or extension) 211 outside the refrigerator which extends inward from an end of the second plate member 20, and an contact part (or contact surface) 212 outside the refrigerator which is in contact with the outer surface of the second plate member 20 at end of the extension part 211 outside the refrigerator.

The extension part 211 outside the refrigerator has a predetermined length so as to have a predetermined length so as to prevent the removal of the outer surface part 210 due to the external weak acting force. In other words, the outer surface part 210 is not completely removed from the second plate member 20 even if the outer surface part 210 is forced so as to be pulled toward the door due to the user's carelessness. However, if the outer surface part 210 is excessively long, there is difficulty in intentional removal at the time of repair and the fastening operation becomes difficult, such that it may be preferable that the outer surface part 210 is limited to a predetermined length.

The contact part 212 outside the refrigerator may be provided with a structure in which the end of the extension part 211 outside the refrigerator is slightly bent toward the surface outside the second plate member 20. According to this, sealing by the contact between the outer surface part 210 and the second plate member 20 becomes perfected, so that foreign matter can be prevented from being introduced.

The side surface part 220 is provided as a surface which is bent at an angle of about 90 degrees from the outer surface part 210 toward the opening of the main body 2 and secures a sufficient width of the side surface part sealing surface 221. The side surface part 220 may be provided thinner than the inner surface part 210 and the outer surface part 230. This may have a purpose of permitting elastic deformation at the time of fastening or removing the sealing frame 200 and a purpose of not permitting a distance to cause a magnetic force between the magnet installed on the gasket 80 and the magnetic body on the main body side to be weakened. The side surface part 220 may have a purpose of protecting the conductive resistance sheet 60 and arranging the outer appearance as an exposed portion of the exterior. In a case where the adiabatic member is laid inside the side surface part 220, the adiabatic performance of the conductive resistance sheet 60 can be reinforced.

The inner surface part 230 is bent and extends from the side surface part 220 by about 90 degrees in an inner direction of the refrigerator, that is, the rear surface direction of the main body. The inner surface part 230 performs an action for fixing the sealing frame 200, an action for installing parts necessary for the operation of a product to which a vacuum adiabatic body is installed such as a refrigerator, and an action for preventing the inflow of outer foreign matters into the inside. The action corresponding to each configuration of the inner surface part 230 will be described.

The inner surface part 230 includes an extension part (or extension wall) 231 inside the refrigerator which is bent and extends from an inner end portion of the side surface part 220; and a first member fastening part (or first member fastening wall) 232 which is bent from the inner end portion of the extension part 231 inside the refrigerator to an outside direction, that is, toward the inner surface of the first plate member 10. The first member fastening part 232 may be in contact with and engaged with the protrusion part 112 of the second reinforcing member 110. The extension part 231 inside the refrigerator may provide a gap which extends to an inside of the refrigerator so that the first member fastening part 232 is engaged inside the second reinforcement member 110.

The first member fastening part 232 may be engaged with the second reinforcing member 110 to draw the supporting action of the sealing frame 200. The second reinforcement member 110 may further include a base part (or base wall) 111 which is fastened to the first plate member 10 and a protrusion part (or protrusion wall) 112 which bends and extends from the base part 111. The rigidity of the second reinforcing member 110 is increased by the structure of the base part 111 and the protrusion part 112 so that the ability to resist the bending strength can be increased.

The second member fastening part (or second member fastening wall) 233 may be fastened to the first member fastening part 232. The first and second member fastening parts 232 and 233 may be provided as separate members to be fastened to each other or may be provided as a single member from at the time of the design thereof.

The second member coupling part 233 may further be provided with a gap forming part (or gap forming wall) 234 that further extends to the inside of the refrigerator from the inner end portion of the second member fastening part 233. The gap forming part 234 may serve as a portion for providing a gap or space where parts necessary for the operation of the appliance such as a refrigerator provided as the vacuum adiabatic body are placed.

An inclined part (or inclined wall) 235 inside the refrigerator is further provided inside the gap forming part 234. The inclined part 235 inside the refrigerator may be provided so as to be inclined so as to approach the first plate member 10 toward the end thereof, that is, toward the inside of the refrigerator. In the inclined part 235 inside the refrigerator, the gap between the sealing frame and the first plate member is provided to be reduced as being directed to the inside thereof so that the volume of the sealing frame 200 occupying the space inside the refrigerator is reduced as much as possible and it is possible to expect an effect of securing a space in which a part such as a lamp is mounted by the cooperation with the gap forming part 234.

A contact part (or contact end) 236 inside the refrigerator is provided at the inner end portion of the inclined part 235 inside the refrigerator. The contact part 236 inside the refrigerator may be provided in a structure in which the end of the inclined part 235 inside the refrigerator is slightly bent toward the inner surface side of the first plate member 10. According to this, sealing by the contact between the inner surface part 230 and the first plate member 10 is perfected, so that it is possible to prevent the inflow of foreign matter or the like.

In a case where an accessory part such as a lamp is installed on the inner surface part 230, the inner surface part 230 may be divided into two parts so as to achieve the purpose of convenience of installation of the part. For example, the inner surface part can be divided into a first member which provides the extension part 231 inside the refrigerator and the first member fastening part 232, and a second member which provides the second member fastening part 233, the gap forming part 234, the inclined part 235 inside the refrigerator, and the contact part 236 inside the refrigerator. The first member and the second member are fastened to each other in such a manner that the second member fastening part 233 is fastened to the first member fastening part 232 in a state where a product such as a lamp is mounted on the second member. Of course, it does not exclude that the inner surface part 230 may be provided in various other manners. For example, the inner surface part 230 may be provided as a single member.

As in the description, the length of the side surface part 220 may be provided so as to be larger than a gap between the plate members 10 and 20 which are provided a gap of the third space, so as to be capable of providing an installation space of the part which is accommodated in the inner surface part 230. In a case where the gap between the plate members varies according to the position, the length of the side surface part 220 may be greater than the average value of the gap between the plate members.

Figure 12:
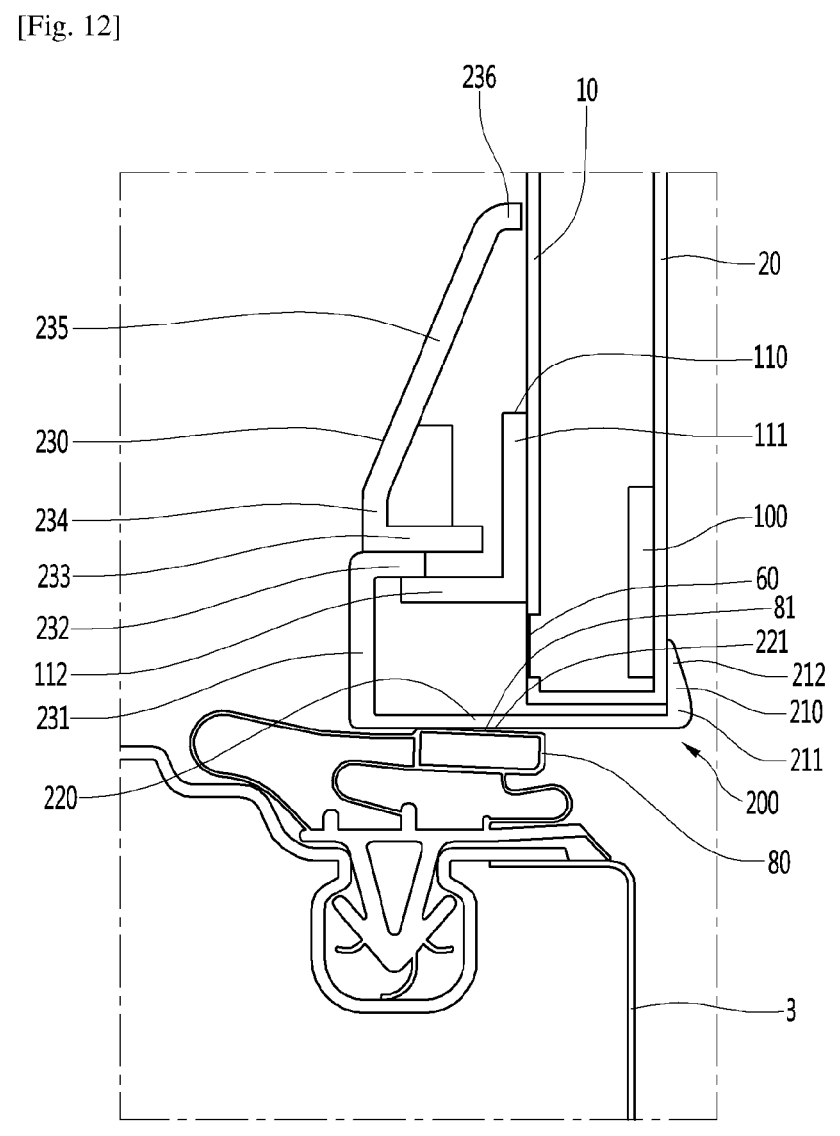

FIG. 12 is a sectional view of a contact part of the main body and the door according to another embodiment. The present embodiment is characteristically different from the example in FIG. 11 in the position of the conductive resistance sheet and accordingly the change of the other portions. Referring to FIG. 12, in this embodiment, the conductive resistance sheet 60 may be provided in the inside of the refrigerator rather than on the end peripheral portion of the vacuum adiabatic body. The second plate member 20 may extend beyond the outside of the refrigerator and the peripheral portion of the vacuum adiabatic body. In some cases, the second plate member 20 may extend a certain length to the inside of the refrigerator. In a case of this embodiment, it can be seen that a conductive resistance sheet can be provided at a position similar to the conductive resistance sheet of the door-side vacuum adiabatic body illustrated in FIG. 4 (section b).

In this case, it is preferable that the second reinforcing member 110 is moved to the inside of the refrigerator without being in contact with the conductive resistance sheet 60 so as to avoid affecting the high thermal conductive adiabatic performance of the conductive resistance sheet 60. This configuration is to achieve the function of the heat bridge of the conductive resistance sheet. Accordingly, the conductive resistance sheet 60 and the second reinforcing member 110 are not in contact with each other, and the conductive adiabatic performance by the conductive resistance sheet and the strength reinforcement performance of the vacuum insulation member by the reinforcing member can be achieved at the same time. This embodiment can be applied to a case where perfect thermal protection and physical protection against the peripheral portion of the vacuum adiabatic body are required.

FIGS. 13 and 14 are partial cutaway perspective views illustrating the fastening of the two members in the embodiment in which the inner surface part is divided into two members. FIG. 13 is a view illustrating a state where fastening of the two members is completed, and FIG. 14 is a view illustrating a fastening process of the two members. Referring to FIGS. 13 and 14, the first member fastening part 232 is engaged with the protrusion part 112 of the second reinforcing member 110 and the outer surface part 210 is supported by the second plate member 20. Accordingly, the sealing frame 200 can be fixed to the peripheral portion of the vacuum adiabatic body.

At least one first member insertion part (or first member coupling extension) 237 which is bent and extends in the inside direction of the refrigerator may be provided at the end portion of the first member fastening part 232, preferably, for each sealing frame 200 installed in the refrigerator. A second member insertion recess 238 may be provided at a position corresponding to the first member insertion part 237. The first member insertion part 237 and the second member insertion recess 238 are similar in size and shape to each other so that the first member insertion part 237 can be inserted into, fitted into, and fixed to the second member insertion recess 238.

The fastening of the first member and the second member will be described. The second member is aligned with respect to the first member so that the second member insertion recess 238 corresponds to the first member insertion part 237 in a state where the first member is fastened to the peripheral portion of the vacuum adiabatic body. By inserting the first member insertion part 237 into the second member insertion recess 238, the two members can be fastened.

Meanwhile, at least a portion of the second member insertion recess 238 may be provided smaller than the first member insertion part 237 so as to prevent the fastened second member from being removed from the first member. Thereby, both members can be tightly fitted to each other. So as to perform an action of being engaged and supported after the second member insertion recess 238 and the first member insertion part 237 are inserted to a predetermined depth, at some point after a predetermined depth, a protrusion and a groove can be provided at both members, respectively. In this case, after the two members are inserted at a certain depth, the two members may be further inserted beyond steps so that the fixing of the two members may be performed to be more stable. Of course, the worker feels that the correct insertion has been performed through the feeling of inserting the first member insertion part 237 into the second member insertion recess 238.

The two members constituting the inner surface part can be fixed in the position and the coupling relation by the configuration in which the two members are fitted and coupled. Alternatively, in a case where the load is large due to the action of the second member fixing the separate part, the first member and the second member are fastened to each other by a separate fastening member such a fastener 239 inside the refrigerator.

FIG. 15 shows views for sequentially illustrating the fastening of the sealing frame in a case of the embodiment in which the sealing frame is provided as two members. Particularly, the case where the part is provided on the inner surface part is exemplified.

Referring to FIG. 15 (section a), the sealing frame 200 is fastened to the peripheral portion of the vacuum adiabatic body. At this time, the fastening can be performed by using the elastic deformation of the sealing frame 200 and the restoring force according to the elastic deformation without a separate member such as a screw.

For example, in a state where the inner surface part 230 is engaged with the second reinforcing member 110, the connection point between the inner surface part 230 and the side surface part 220 may be used as a center of rotation, and the side surface part 220 and the outer surface part 210 are rotated in a direction of the second plate member 20. This action can cause the elastic deformation of the side surface part 220.

Thereafter, the outer surface part 210 moves inward from the outer surface of the second plate member 20 and the elasticity restoring force of the side surface part 220 acts so that the outer surface part 210 can be lightly fastened to the outer surface of the second plate member 20. When the fastening of the sealing frame 200 is completed, the sealing frame 200 can be seated in the original position thereof designed to the designed original shape.

Referring to FIG. 15 (section b), a state where the fastening of the first member of the sealing frame 200 is completed is illustrated. The side surface part 220 may be formed to be thinner than the outer surface part 210 and the inner surface part 230 so that the sealing frame 200 can be fastened to the peripheral portion of the vacuum adiabatic body by elastic deformation and elastic restoring action of the sealing frame.

Referring to FIG. 15 (section c), the part seating member (or second frame) 250 as a second member that provides the inner surface part 230 is provided as a separate part. The part seating member 250 is a part on which a part (or electrical component) 399 is placed and the set position thereof can be supported, and the additional function necessary for the action of the part 399 can be further performed. For example, in the present embodiment, in a case where the part 399 is a lamp, the gap forming part 234 may be provided on the part seating member 250 as a transparent member. Therefore, this configuration allows the light emitted from the lamp to pass through the inner surface part 230 and to be emitted into the refrigerator and allows the user to identify the product in the refrigerator.

The part seating member 250 may have a predetermined shape that can be fitted with the part 399 to fix the position of the part 399 so that the part 399 is seated. FIG. 15 (section d) illustrates a state where the part 399 is placed on the part seating member 250.

Referring to FIG. 15 (section e), the part seating member 250 on which the part 399 is seated is aligned in a predetermined direction so as to be fastened to the first member that provides the inner surface part. In the embodiment, the first member fastening part 232 and the second member insertion recess 238 can be aligned to each other in the extending direction so that the first member fastening part 232 is fitted to the second member insertion recess. Of course, although not limited in this way, it may be preferably proposed to enhance the ease of assembly.

The first member fastening part 232 is slightly larger than the second member insertion recess 238 so that the first member fastening part 232 and the second member insertion recess 238 are tightly fitted to each other, and an engagement structure such as a step and a protrusion can be introduced for light insertion. Referring to FIG. 15 (section f), the inner surface part in a state where the assembling is completed can be seen.

FIGS. 16 and 17 are views illustrating any one end portion of the sealing frame, wherein FIG. 16 is a view before the door hinge is installed, and FIG. 17 is a view a state where the door hinge is installed. In a case of a refrigerator, a door hinge is provided at the connection part so that the door-side vacuum adiabatic body is fastened to the main body-side vacuum adiabatic body in a state of being capable of being rotated. The door hinge has to have a predetermined strength and can prevent door sagging due to the own weight thereof in a state where the door is fastened and prevent the main body from being distorted.

Referring to FIG. 16, so as to fasten the door hinge 263, a door fastener 260 is provided on the main body-side vacuum adiabatic body. Three door fasteners 260 may be provided. The door fastener 260 can be directly or indirectly fixed to the second plate member 20, the reinforcing members 100 and 110, and/or a separate additional reinforcing member (for example, additional plate which is further provided to outer surface of second plate member). Here, direct fixing may be referred to as one by a fusion method such as welding, and indirect fixing may be referred to as a fastening method using an auxiliary fastening tool or the like instead of the method such as fusion or the like.

Since the door fastener 260 is required to have a high supporting strength, the door fastener 260 can be fastened while contacting the second plate member 20. For this, the sealing frame 200 may be cut, and the sealing frame 200 to be cut may be an upper sealing frame 200*b* at the upper corner of the main body-side vacuum adiabatic body. In addition, the sealing frame 200 to be cut may be a right sealing frame 200*a*, 200*f*, and 200*g* at the right corner of the main body-side vacuum insulating body and the lower sealing frame 200*e* at the lower edge of the main body-side vacuum insulating body. If the door installation direction is different, the sealing frame 200 to be cut may be a left sealing frame 200*a*, 200*f*, and 200*g* at the left corner of the main body-side vacuum adiabatic body.

The sealing frame 200 to be cut may have a cut surface 261 and the second plate member 20 may have a door fastener seating surface 262 to which the door fastener 260 is fastened. Accordingly, the door fastener seating surface 262 can be exposed to the outside by the cut of the sealing frame 200, and an additional plate member can be further interposed in the door fastener seating surface 262.

The end portion of the sealing frame 200 may not be entirely removed, but a portion of the sealing frame 200 may be removed only at a portion where the door fastener 260 is provided. However, it is more preferable to remove all the end portion of the sealing frame 200 so as to facilitate the manufacturing and to firmly support and fasten the door hinge 263 on the side of the vacuum adiabatic body.

FIG. 18 is a view for explaining the effect of the sealing frame according to the present disclosure in comparison with the related art, wherein FIG. 18 (section a) is a sectional view of a contact part between the main body-side vacuum adiabatic body and a door according to the present disclosure, and FIG. 18 (section b) is a sectional view illustrating the main body and the door according to the related art. Referring to FIG. 18, in the refrigerator, a hotline (or heater) may be installed at the contact part between the door and the main body so as to prevent dew formation due to abrupt temperature change. As the hotline is closer to the outer surface and the peripheral portion of the main body, dew formation can be removed even with a small heat capacity.

According to the embodiment, the hotline 270 may be placed in an inner space of a gap between the second plate member 20 and the sealing frame 200. A hotline accommodation part (or hotline accommodation wall) 271 in which the hotline 270 is placed may be further provided in the sealing frame 200. Since the hotline 270 is placed outside the conductive resistance sheet 60, the amount of heat transferred to the inside of the refrigerator is also small. This makes it possible to prevent dew formation of the main body and the door contact part even with a smaller heat capacity. In addition, by allowing the hotline 270 to be relatively placed on the outside of the refrigerator, that is, a portion which is bent between the peripheral portion of the main body and the outer surface of the main body, it is possible to prevent entry of heat into the refrigerator space.

In the embodiment, the side surface part 220 of the sealing frame 200 may have a portion w1 which is aligned with the gasket 80 and the vacuum space part 50 and a portion w2 which is not aligned with the vacuum space part 50 and is aligned with the refrigerator space. This is the portion provided by the side surface part 220 to ensure sufficient cold air blocking by the magnet. Therefore, the sealing action by the gasket 80 can be sufficiently achieved by the sealing frame 200.

In the embodiment, the inclined part 235 inside the refrigerator is provided to be inclined toward the inner surface of the first plate member 10 at a predetermined angle β. This can increase the volume in the refrigerator like a hatched portion and can provide an effect of enabling a narrow space inside the refrigerator to make more widely available. In other words, it is possible to widely utilize the space in the vicinity of the door by inclining the inclined part inside the refrigerator in a direction opposite to the predetermined angle a directed toward the space inside the refrigerator as in the related art. For example, it is possible to accommodate more food in the door and to obtain more space which can accommodate the various parts necessary for the operation of the appliance.

Hereinafter, FIGS. 19 to 24 illustrate various embodiments in which the sealing frame 200 is installed. Referring to FIG. 19, the second reinforcing member 110 may provide only the base part 111 and may not provide the protrusion part 112. In this case, a groove 275 may be provided in the base part 111. The end portion of the first member fastening part 232 may be inserted into the groove 275. This embodiment can be preferably applied in a case of a product which can provide sufficient strength without providing the protrusion part 112 in the second reinforcing member 110.

In a case of the present embodiment, as a process of the end portion of the first member fastening part 232 being fitted in the groove 275 and aligned when the sealing frame 200 is fastened, the sealing frame 200 is fastened to the end portion of the vacuum adiabatic body. According to the fastening action between the groove 275 and the first member fastening part 232, by only the fastening between the inner surface part 230 of the sealing frame 200 and the second reinforcing member 110, it is possible to stop the movement of the sealing frame 200 in the y-axis direction.

Referring to FIG. 20, when this embodiment is compared with the embodiment illustrated in FIG. 19, this embodiment differs from the embodiment illustrated in FIG. 19 in that a reinforcing base part 276 is further provided to the base part 111. The reinforcing base part 276 is further provided with a groove 277 so that the end portion of the first member fastening part 232 can be inserted. This embodiment can be applied when it is necessary to reinforce the strength to a predetermined level even though the protrusion part 112 is not provided to the second reinforcing member 110 due to lack of the installation space, interference, or the like. In other words, it is preferably applied when the strength reinforcement effect of the main body-side vacuum adiabatic body can be provided at a level of strength reinforcement that can be obtained by further installing a reinforcing base 276 at the outer end of the base part 111.

A groove 277 is provided in the reinforcing base part 276 and the end portion of the first member fastening part 232 is fitted and aligned in the groove portion 277 so that the sealing frame 200 can be fastened to the end portion of the vacuum adiabatic body. Even in a case of the fastening action of the groove 277 and the first member coupling part 232, the movement of the sealing frame 200 in the y-axis direction can be stopped only by only fastening between the inner surface part 230 of the sealing frame 200 and the second reinforcing member 110.

Referring to FIG. 21, when the present embodiment is compared with the embodiment illustrated in FIG. 19, the present embodiment differs from the embodiment illustrated in FIG. 19 in that the base part 111 is further provided with a reinforcing protrusion 278. The end portion of the first member fastening part 232 may be engaged with the reinforcing protrusion 278. Even if the second reinforcing member 110 is not provided with the protrusion part 112 or the reinforcing base part 276 due to lack of the installation space, interference, or the like, the present embodiment can be applied when the strength thereof is reinforced to a predetermined level and there is a need to ensure that the first member fastening part 232 is engaged. In other words, by further installing the reinforcing protrusion 278 at the outer end portion of the base part 111, the effect of reinforcing the strength of the main body-side vacuum adiabatic body can be obtained. In addition, the reinforcing protrusion 278 can be preferably applied because the reinforcing protrusion can provide an engagement action of the first member fastening part 232. The first member fastening part 232 is engaged and supported to the reinforcing protrusion 278 so that the sealing frame 200 can be fastened to the end portion of the vacuum adiabatic body.

The embodiment illustrated in FIGS. 19 to 21 illustrates a case where the inner surface part 230 is provided as a single product without being separated into the first member and the second member and is fastened to the vacuum adiabatic body. However, the inner surface part may be separated into two members without being limited thereto. Although the embodiment described above provides a case where the second reinforcing member 110 is provided, the following embodiments will describe fastening of the sealing frame 200 in a case where no additional reinforcing member is provided inside the first plate member 10.

Referring to FIG. 22, the first reinforcing member 100 is provided to reinforce the strength of the vacuum adiabatic body, but the second reinforcing member 110 is not separately provided. In this case, the inner protrusion 281 may be provided on the inner surface of the first plate member 10 so that the sealing frame 200 is fastened. The inner protrusion 281 can be fastened to the first plate member 10 by welding, fitting, or the like. The present embodiment can be applied in a case where the sufficient strength of the main body-side vacuum adiabatic body can be obtained only by the reinforcing members provided in the first reinforcing member 100, that is, the vacuum space part 50, or in a case where the reinforcing member can be installed on a side of the second plate member 20.

The first member fastening groove 282 may be provided in the first member fastening part 232 so as to be capable of being fitted and fixed to the inner protrusion 281. In the first member fastening groove 282, by inserting the inner protrusion 281, the fastening position of the sealing frame 200 can be fixed.

Referring to FIG. 23, when being compared with the embodiment illustrated in FIG. 22, FIG. 23 characteristically differs from the embodiment illustrated in FIG. 22 in that, in FIG. 23, the first member fastening groove 282 is not provided. According to the present embodiment, the position of the sealing frame 200 can be supported by one end of the first member fastening part 232 being supported by the inner protrusion 281.

When being compared with the embodiment illustrated in FIG. 22, in this embodiment, there is a disadvantage that the movement of the sealing frame 200 in the y-axis direction is stopped only in one direction instead of stopping the movement of the sealing frame 200 in the y-axis direction in both directions. However, an advantage that a worker can conveniently work at the time of fastening the sealing frame 200 can be expected.

The embodiment illustrated in FIGS. 19 to 23 is provided as a configuration in which a side of the first plate member 10 is fixed, and the movement of a side of the second plate member 20 such as sliding is allowed. In other words, the second plate member 20 and the outer surface part 210 are allowed to be relatively slidable, and the relative movement of the first plate member 10 and the inner surface part 230 is not allowed. Such a configuration can be configured opposite to each other. Hereinafter, such a configuration is proposed.

Referring to FIG. 24, an outer protrusion 283 may be provided on the outer surface of the second plate member 20 and an outer engagement part 213 may be provided on the outer surface part 210 of the sealing frame 200. The outer engagement part 213 can be engaged with the outer protrusion 283 and supported. In a case of the present embodiment, the inner surface part 230 of the sealing frame 200 may be allowed to move with respect to the inner surface part of the first plate member 10, such as a sliding. In this embodiment, mounting and fixing of the sealing frame 200 differ only in the direction and the same description can be applied.

Various embodiments may be further proposed in addition to the embodiment related to FIG. 24. For example, the reinforcing members 100 and 110 may be further installed on the second plate member 20, and the various structures of FIGS. 19 to 21 may be provided with respect to the reinforcing member. Also, the outer engagement part 213 may be provided as a groove structure as illustrated in FIG. 22.

According to the present embodiment, there is a difference in a configuration in which the fastening direction of the sealing frame 200 can be provided in a direction opposite to the original embodiment. However, the fundamental action of the sealing frame can be obtained in the same way. Hereinafter, a description will be given of a configuration in which a part is installed to an appliance such as a refrigerator to which a vacuum adiabatic body is applied and a wiring is applied to the part.

FIG. 25 is a front view of the upper right side of the main body-side vacuum adiabatic body. Referring to FIG. 25, a reinforcing member 100, more specifically, a second reinforcing member 110 is provided together with the first plate member 10 and the second plate member 20. The second reinforcing member 110 is placed on the inner surface of the first plate member 10 to reinforce the strength of the main body-side vacuum adiabatic body. The second reinforcing member 110 is provided in the form of a long rod along the corner of the vacuum adiabatic body to reinforce the strength of the vacuum adiabatic body.

The protrusion part 112 of the second reinforcing member 110 may be provided with a slit. The slits 115 and 116 serve as holes through which wirings pass so that the worker can conveniently locate the wirings. It is possible to prevent breakage of the wiring due to the bending of the wiring by placing the wiring in the slit.

The slit may be provided as a first slit 115 which is provided in the second reinforcing member 110 at the corner portion of the upper surface of the vacuum adiabatic body or as a second slit 116 which is provided in the second reinforcing member 110 in the side corner portion of the vacuum insulating member. The slit may be provided corresponding to the portion through which the wiring passes, and may be formed at another position of the second reinforcing member 110. In a case of the embodiment, a lamp which illuminates the interior of the refrigerator is exemplified as a part, and a slit can be provided at the end portion of each edge to guide the wiring of the part (see part 399 in FIG. 26).

Since the slits 115 and 116 can serve as stress concentration points for weakening the strength of the reinforcing member, it is preferable to remove the protrusion part 112 to the height of the level at which the wiring escapes from the part such as the lamp without removing the entire protrusion part 112 as much as possible. The vertex portions of the slits

115 and 116 may be chamfered or rounded to provide smooth round-shaped vertices. According to this configuration, the wiring passing through the slit can be prevented from being damaged or broken.

FIG. 26 and FIG. 27 are sectional views of a corner portion of the vacuum adiabatic body in a state where the lamp is installed, FIG. 26 is a sectional view illustrating a portion through which the lamp wiring does not pass, and FIG. 27 is a sectional view illustrating a portion through which the lamp wiring passes. Hereinafter, as a part, the lamp will be described as an example, and the part may be referred to as the lamp but may be referred to as the part.

Referring to FIGS. 26 and 27, it is possible to confirm a state where the part 399 is installed, and the lamp is placed inside the gap forming part 234 as a part necessary for the refrigerator. Wires 402 and 403 of the part 399 extend outward at a gap between the inner surface part 230 and the second reinforcing member 110. Specifically, the wires 402 and 403 of the part 399 extend outward at a gap part between the first member fastening part 232, the second member fastening part 233, and the second reinforcing member 110.

The end portion of the second member fastening part 233 is spaced apart from the base part 112 by a predetermined gap so as to provide a gap through which the wirings 402 and 403 can pass in the second member fastening part 233. Of course, the second member fastening part 233 may be provided with a slit such as that provided in the protrusion part 112.

Referring to FIG. 26, the first member fastening part 232 and the protrusion part 112 are in contact with each other for supporting the sealing frame 200. Referring to FIG. 27, the slits 115 and 116 may extend beyond the end of the first member fastening part 232. The wiring can be drawn out of the protrusion part 112 through the gap between the slits 115 and 116 and the end portions of the first member fastening part 232. According to the configuration of the slits 115 and 116, the wirings 402 and 403 can be guided to the outside through the slit, and at this time, there may be no interference structure that can break the wiring.

FIG. 28 is an exploded perspective view illustrating the peripheral portion of the part. Referring to FIG. 28, a part 399, a part fixing frame (or second frame) 400 on which the part 399 is seated, and the sealing frame 200 are illustrated. The part fixing frame 400 provides a portion of the inner surface part (or inner surface wall) 230 of the sealing frame (or first frame) 200. The part fixing frame 400 has constituent elements for seating the part 399 thereon.

The part fixing frame 400 has a shape elongated in one direction and is a member corresponding to the second member constituting the inner surface part when observed in the section thereof and can provide the second member fastening part 233, the gap forming part 234, the inclined part 235 inside the refrigerator, and the contact part 236 inside the refrigerator. Functions and actions of configurations already described can be applied to each configuration when observed in the section thereof.

In the part fixing frame 400, a second member insertion recess 238 can be provided at a position corresponding to the first member insertion part 237 which is bent and extended in the inner direction of the refrigerator in the end portion of the first member fastening part 232. The first member insertion part 237 and the second member insertion recess 238 are similar in size and shape to each other so that the first member insertion part 237 can be inserted into, fitted into, and fixed to the second member insertion recess 238. The first member insertion part 237 and the second member insertion recess 238 can be fastened by an additional fastener in the refrigerator 239. In other cases, the part fixing frame 400 may be directly fastened to the second reinforcing member 110.

The inner spaces of the gap forming part 234 and the inclined part 235 inside the refrigerator may form a space in which the part 399 is seated. A part seating rib 404 may be provided on the inner surfaces of the gap forming part 234 and the inclined part 235 inside the refrigerator. The part seating rib 404 can fix the lamp seating position as a portion where both end portions of the lamp main body are supported.

The electric wire accommodation ribs 406 may be formed on the outside of the part seating ribs 404. The gap part between the part seating rib 404 and the electric wire accommodation rib 406 may provide an electric wire accommodation part 405. The electric wire accommodation part (or accommodation space) 405 provides a space in which an electric wire for applying power to the part 399 is placed or a predetermined part necessary for the operation of the part 399 can be accommodated. The electric wire accommodation ribs 406 and the electric wire accommodation part 405 may be provided on both sides of the part fixing frame 400. Accordingly, inventory costs can be reduced through the common use of parts.

The wirings 402 and 403 drawn outward from the electric wire accommodation part 405 can pass through the gap part between the upper end of the first member fastening part 233 and the base part 111. The wires 402 and 403 can pass through the slits 115 and 116, enter the gap part between the side surface part 220 and the protrusion part 112 of the sealing frame 200 and be guided elsewhere along the gap part therebetween.

An inclined rib 407 may be provided at both end portions of the part fixing frame 400. The inclined ribs 407 are provided so as to be widened toward the rear from the front end portion of the part fixing frame 400. In the drawing, when referring to an index line extending along the electric wire accommodation rib 406 and an index line extending along the end portion of the inclined rib 407, the structure of the inclined rib will be more accurately understood in a case where the angle g therebetween is referred.

In the inclined ribs 407, the part fixing frame 400 is in contact with the inner surface part 230 of the sealing frame 200 adjacent to the part fixing frame 400 to eliminate the gap between the members. This makes it possible to provide a wider internal space in the refrigerator in a case of a refrigerator. For example, the part fixing frame 400 and the adjacent sealing frame 200 can be accurately in contact with each other in accordance with the inclination angle of the inclined part 235 inside the refrigerator provided as b In FIG. 18.

FIGS. 29 and 30 are sectional views taken along line A-A' and B-B' in FIG. 28, and are illustrated in a time sequence. The fastening of the sealing frame and the part fixing frame can be understood by FIG. 29, and alignment of the sealing frame and the part fixing frame can be understood by FIG. 30.

Referring to FIGS. 29 and 30, in a case where the part 399 is placed on the part fixing frame 400 and the part on the lower side of the part 399 is a lamp, the gap forming part 234 is provided as a transparent member so that light can be emitted. This allows the light emitted from the lamp to pass through the interior surface 230 and to be emitted to the inside of the refrigerator and allows the user to identify the products in the refrigerator.

The part fixing frame 400 on which the part 399 is seated is aligned in a predetermined direction so as to be fastened to the sealing frame 200. In the embodiment, the first member insertion part (or insertion extension) 237 and the second member insertion recess (or receiving recess) 238 are aligned to each other in the extending direction of each member so that the first member insertion part 237 can be fitted into the second member insertion recess 238. The first member insertion part 237 is slightly larger than the second member insertion recess 238 so that the first member insertion part 237 and the second member insertion recess 238 can be tightly fitted and an engagement structure such as a step and a protrusion can be introduced for light insertion.

Hereinafter, the path of the wiring drawn out of the protrusion part 112 of the second reinforcing member 110 through the slits 115 and 116 will be described. FIG. 31 is a front view illustrating one side portion of the upper part of the refrigerator, and FIG. 32 is a schematic view illustrating the upper surface of the refrigerator from the outside.

Referring to FIGS. 31 and 32, the wirings 402 and 403 drawn out through the slit 115 can move along the gap between the protrusion part 112 and the side surface part 220 of the sealing frame 200 in any direction.

The sealing frame 200 is a member to be observed on the outside and has a gap without being in contact with internal parts so as to have a beautiful outer appearance. The sealing frame 200 may not be in contact with the conductive resistance sheet 60 so as to prevent the loss of the cold air due to contact with the conductive resistance sheet 60. Accordingly, the wirings 402 and 403 can ride over the sealing frame 200 through the gap between the sealing frame 200 and the inner parts. Preferably, the wirings 402 and 403 can move the gap between the outer surface of the protrusion part 112 and the side surface part 220 of the sealing frame 200 so as to prevent the loss of the cold air due to contact between the conductive resistance sheet 60 and the wirings 402 and 403.

A controller 450 is provided on the upper surface of the refrigerator. The controller 450 is a portion on which electric parts including a processor which controls the entire operation of the refrigerator are mounted. Since the controller 450 is placed on the upper surface of the refrigerator, it is convenient to easily perform the after-service without operations such as an operation which moves the position of the refrigerator.

The part 399 is a member which is operated under the control of the controller 450. The wiring may extend to a side of the controller along any one side corner through a gap between the outer surface of the protrusion part 112 and the side surface part 220 of the sealing frame 200. The wiring can be drawn to the side of the controller 450 after moving right up to the front of the controller 450. Specifically, the wiring passes through a gap between the side surface part 220 of the sealing frame 200 and the conductive resistance sheet 60, passes through a gap between the outer surface part 210 and the second plate member 20, and reaches the controller 450.

The wirings 402 and 403 can be exemplified as a lead-in wire and a lead-out wire of a power source and a connector can be mounted in advance at the end portion thereof. The worker can complete the assembly by inserting the connector into the socket of the controller 450.

FIG. 33 is a sectional view illustrating the upper end portion of the refrigerator. Referring to FIG. 33, it can be seen that the wires 402 and 403 pass the gap between the second reinforcing member 110 and the sealing frame 200. At this time, the wirings 402 and 403 approach the second reinforcing member 110. This is because adiabatic material 470 intervenes between the gap between the conductive resistance sheet 60 and the sealing frame 200 and the gap between the second reinforcing member 110 and the sealing frame 200 during the fastening process.

The adiabatic material 407 is to prevent the loss of cold air of the conductive resistance sheet 60 and prevent a loss of cool air outside the second reinforcing member 110. The original shape of the sealing frame 200 can be maintained by the adiabatic material 407 and the installation position of the wirings 402 and 403 can be fixed.

According to aspects of the present disclosure, parts can be stably installed in an appliance such as a refrigerator to which a vacuum adiabatic body is applied, thereby promoting commercialization to which a vacuum adiabatic body is applied. Aspects of the present disclosure mount parts necessary for an operation of the device without affecting an adiabatic performance of a vacuum adiabatic body. An aspect of the present disclosure is to guide the wiring necessary for the operation of the refrigerator without affecting the adiabatic performance of the vacuum adiabatic body. As aspect of the present disclosure relates to a refrigerator which improves the difficulty of assembling.

A vacuum adiabatic body according to the present disclosure includes a conductive resistance sheet which connects plate members which provide walls of the vacuum adiabatic body to each other; a sealing frame which covers the conductive resistance sheet; a part fixing frame which is supported by the sealing frame; and a part which is mounted on the part fixing frame. According to this, the parts necessary for the action of the vacuum adiabatic body can be stably fastened.

The wiring necessary for the operation of the part does not need to damage a vacuum space part of the vacuum adiabatic body, the thermal efficiency is improved, and the work becomes easy, by connecting a first space and a second space outside the conductive resistor sheet. The vacuum adiabatic body further includes a reinforcing member for reinforcing the strength of the plate member; and a slit which is provided on the reinforcing member to allow the wiring to pass therethrough, thereby preventing breakage of the electric wire which passes through the reinforcing member, and improving the operational reliability of the product.

The corner of the slit may be rounded to prevent the electric wire from being peeled off. The wiring is drawn out forward through the slit and is laterally drawn out through a gap part between the reinforcing member and the sealing frame to secure a guidance space for the electric wire.

The part fixing frame has an elongated shape in one direction and further includes the part seating rib on which the part is seated; and an electric wire accommodation part which is provided on the outside of the part seating rib. According to this, the part to which power is supplied can be conveniently seated.

At least one of the end portions of the part fixing frame is provided with an inclined rib, thereby securing the surface contact between the adjacent parts, thereby securing the sealing and preventing the failure due to the unexpected entry of the external product. In particular, it is possible to prevent the phenomenon of dew invasion. At least one of the portions corresponding to each other of the part securing frame and the sealing frame is fitted and fastened to each other so that a worker can conveniently work at a production site. Heat loss through the conductive resistance sheet can be further reduced by including the adiabatic material that is placed in a gap between the sealing frame and the conductive resistance sheet.

A refrigerator according to the present disclosure includes: a main body which has an opening with respect to an accommodation space of a product; a controller which is provided outside any one side of the main body; a part which is provided in the accommodation space; and a wiring which passes through a gap between the main body and the door so as to connect the part and the controller. According to this, since the necessary wiring for the operation inside the main body does not directly pass through the main body, the operation becomes easy and the heat loss can be reduced.

The refrigerator further includes a reinforcing member which is provided on an inner surface of a peripheral portion of the main body; a sealing frame which seals a front peripheral portion of the main body and with which the door is in contact; and a part fixing frame which is placed in the accommodation space and mounts the part. According to this, the part can be conveniently mounted on the main body.

The refrigerator further includes a slit which is formed in the reinforcing member so that the wiring is drawn out toward the front of the reinforcing member. According to this, it is possible to easily place the electric wire which supplies power to the part requiring the external power source, so that the stable operation of the part can be secured.

The wiring is laterally drawn out through a gap between the reinforcing member and the sealing frame so that the wiring can be stably guided. The refrigerator further includes a first member insertion part which is provided in the sealing frame; and a second member insertion recess which is formed in the member fixing frame so that the first member insertion part is fitted. According to this, the structure can be provided while being changed corresponding to various parts.

The wiring is drawn out to the outside of the main body through a gap between the inner surface of the sealing frame and the outer surface of the main body, thereby improving the space usability. The controller is placed on the upper surface of the outer part of the main body, and the wiring is drawn out of the main body immediately in front of the controller. According to this, the external exposure of the wiring is suppressed as much as possible, and production and repair thereof become convenient.

A refrigerator according to the present disclosure includes: a main body which has an opening with respect to an accommodation space of a product and is provided as a vacuum adiabatic body; a door which opens and closes the opening of the main body; a reinforcing member which is disposed inside the peripheral portion of the main body opening; a gasket which is installed on the door for sealing with respect to the part where the door and the main body are in contact with each other; a sealing frame which is fixed to a peripheral portion of the main body opening so that the gasket is in contact with the sealing frame; a part fixing frame which is fastened to any one of the sealing frame and the reinforcing member and placed in the accommodation space; a part which is fixed to the part fixing frame; a controller which controls the operation of the part; and a wiring which connects the controller and the part so as to supply power to the part. According to this, the vacuum adiabatic body can be used to stably supply power to the part necessary for the operation of the refrigerator. The wiring may pass through a gap between the main body and the door to stably guide the electric wire.

At the end part of the part fixing frame, an inclined rib is provided. According to this, the part fixing frames can be in surface contact with each other in correspondence with the respective surfaces, so that sealing of the contact surface can be ensured. The slit through which the wiring is passed is formed in the reinforcing member so that the electric wire can be guided so as to draw out to the outside.

According to the present disclosure, in an appliance such as a refrigerator to which a vacuum adiabatic body is applied, the energy consumption efficiency can be improved because the wiring does not pass through the vacuum adiabatic body. According to the present disclosure, parts such as lamps are indirectly installed in the vacuum adiabatic body, thereby being capable of preventing the loss of the cold air and preventing product failure due to wiring breakage. According to the present disclosure, a worker can conveniently produce a product.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum adiabatic body comprising:
a first plate;
a second plate, a vacuum space being provided between the first plate and the second plate;
a first frame configured to cover at least one of an end of the first plate or an end of the second plate, the first frame including:
a first surface wall which extends in a first direction between the first plate and the second plate;
a second surface wall including a first portion that extends in an extension direction of the first plate and is supported by the first plate; and
a third surface wall including a second portion that extends in an extension direction of the second plate and is supported by the second plate; and
a second frame on which a part is seated and that is connected to the first frame, the second frame including:
a first wall connected to the first frame;
a second wall positioned to face the part and configured to support at least a portion of the part; and
a third wall positioned to face the first plate and supported by the first plate,
wherein the first portion of the second surface wall includes an extension part bent from the first surface wall and a fastening part bent from the extension part, and wherein a protrusion is provided at an end of the fastening part, and the first wall of the second frame includes a recess into which the protrusion is inserted.

2. The vacuum adiabatic body of the claim 1, wherein the part is provided between the second wall of the second frame and the first plate.

3. The vacuum adiabatic body of the claim 1, wherein a length of the first surface wall in the first direction extending between the first plate and the second plate is greater than an average distance between the first plate and the second plate in the first direction.

4. The vacuum adiabatic body of the claim 1,
wherein a length of the second surface wall is different from a length of the third surface wall such that the first frame is configured to be attached or detached to the first plate and the second plate,
wherein the length of the second surface wall is a distance between a first distal end and a second distal end of the second surface wall in an extension direction of the first plate, and
wherein the length of the third surface wall is a distance between a first distal end and a second distal end of the third surface wall in an extension direction of the second plate.

5. The vacuum adiabatic body of the claim 4, wherein the length of the third surface wall is greater than the length of the second surface wall.

6. The vacuum adiabatic body according to claim 1, wherein the second wall of the second frame is positioned between the recess of the first wall and the third wall of the second frame.

7. A vacuum adiabatic body comprising:
a first plate;
a second plate, a vacuum space being provided between the first plate and the second plate;
a sheet which seals between the first plate and the second plate so as to provide the vacuum space and is positioned to cover respective ends of the first plate and the second plate;
a first frame including:
a first surface wall to cover the sheet;
a second surface wall extending in an extension direction of the first plate; and
a third surface wall extending in an extension direction of the second plate and having a first end that is supported by the second plate; and
a second frame on which a part is seated, the second frame including a first wall including a surface positioned to face the part and configured to support at least a portion of the part, a second wall connected to the first frame and a third wall to contact the first plate,
wherein the first wall is spaced apart from the first plate, and the at least a portion of the part is disposed between the first wall of the second frame and the first plate.

8. The vacuum adiabatic body of claim 7,
wherein the sheet includes a first end that is supported by the first plate and a first surface wall which is formed in a first direction between the first plate and the second plate, and
wherein the first end of the sheet includes a second surface wall extending in an extension direction of the first plate.

9. The vacuum adiabatic body of claim 7,
wherein the sheet includes a second end that is supported by the second plate and a first surface wall which is formed in a first direction between the first plate and the second plate, and
wherein the second end of the sheet includes a third surface wall extending in an extension direction of the second plate.

10. The vacuum adiabatic body according to claim 7, further comprising:

wiring which is electrically coupled to the part, a section of the wiring extending along an outer surface of the sheet.

11. The vacuum adiabatic body according to claim 10, wherein the second frame includes:

a seating rib on which the part is seated; and an electric wire accommodation space which is configured to receive the wiring and is provided outside of the seating rib.

12. The vacuum adiabatic body according to claim 7, further comprising a reinforcing beam disposed between the first plate and the second surface wall.

13. The vacuum adiabatic body according to claim 7, wherein the second surface wall includes a second end coupled to the second wall of the second frame, and wherein a distance from the second end of the second surface wall toward the first plate is greater than a distance from the first end of the third surface wall toward the second plate.

14. The vacuum adiabatic body according to claim 7, wherein the second wall and the third wall are bent from both ends of the first wall.

\* \* \* \* \*